US011359308B2

(12) United States Patent
Campbell et al.

(10) Patent No.: US 11,359,308 B2
(45) Date of Patent: *Jun. 14, 2022

(54) HIGH-PERMEABILITY CELLULOSE FIBERS

(71) Applicant: GP Cellulose GMBH, Zug (CH)

(72) Inventors: Alan Jeffrey Campbell, Germantown, TN (US); Sonja McNeil Fields, Memphis, TN (US); Danny R. Moore, Collierville, TN (US); Stephen Skirius, Collierville, TN (US)

(73) Assignee: GP CELLULOSE GMBH, Zug (CH)

( * ) Notice: Subject to any disclaimer, the term of this patent is extended or adjusted under 35 U.S.C. 154(b) by 26 days.

This patent is subject to a terminal disclaimer.

(21) Appl. No.: 16/945,010

(22) Filed: Jul. 31, 2020

(65) Prior Publication Data

US 2020/0362473 A1  Nov. 19, 2020

Related U.S. Application Data

(63) Continuation of application No. 14/776,351, filed as application No. PCT/IB2014/001139 on Mar. 14, 2014, now Pat. No. 10,767,280.

(Continued)

(51) Int. Cl.
| | | |
|---|---|---|
| *D01F 2/24* | (2006.01) | |
| *D21C 9/00* | (2006.01) | |
| *D21H 11/20* | (2006.01) | |
| *D21H 27/00* | (2006.01) | |
| *D21H 27/08* | (2006.01) | |
| *D21H 27/10* | (2006.01) | |
| *C08B 16/00* | (2006.01) | |
| *D06M 11/38* | (2006.01) | |

(52) U.S. Cl.
CPC ............... *D01F 2/24* (2013.01); *C08B 16/00* (2013.01); *D06M 11/38* (2013.01); *D21C 9/001* (2013.01); *D21C 9/002* (2013.01); *D21H 11/20* (2013.01); *D21H 27/002* (2013.01); *D21H 27/08* (2013.01); *D21H 27/10* (2013.01)

(58) Field of Classification Search
None
See application file for complete search history.

(56) References Cited

U.S. PATENT DOCUMENTS

| | | | |
|---|---|---|---|
| 4,388,256 A | 6/1983 | Ishida et al. | |
| 4,399,839 A | 8/1983 | Hutschenreuter et al. | |
| 4,855,048 A * | 8/1989 | Tang | B01D 67/0095 210/500.3 |

(Continued)

FOREIGN PATENT DOCUMENTS

| | | | |
|---|---|---|---|
| CA | 1292218 | * | 11/1991 |
| CA | 1292218 C | | 11/1991 |

(Continued)

OTHER PUBLICATIONS

Complete Textile Glossary, Celanese Acetate, LLC., 2001. pp. 45 and 160.

(Continued)

*Primary Examiner* — Shawn Mckinnon

(57) ABSTRACT

High permeability curly fibers with enhanced fiber strength are produced by mercerizing cellulosic fibers. The fibers have relatively high values for curl, kink level, wet tensile strength, and bulk density when compared with current fibers. The disclosed fibers can be used in a wide range of applications including paper products such as filters.

20 Claims, 4 Drawing Sheets

Related U.S. Application Data

(60) Provisional application No. 61/800,757, filed on Mar. 15, 2013.

(56) References Cited

U.S. PATENT DOCUMENTS

| | | | |
|---|---|---|---|
| 5,858,021 | A | 1/1999 | Sun et al. |
| 6,837,970 | B2 | 1/2005 | Ko et al. |
| 6,896,810 | B2 | 5/2005 | Ali et al. |
| 7,022,837 | B2 | 4/2006 | Harding et al. |
| 2003/0000665 | A1 | 1/2003 | Takai et al. |
| 2003/0108739 | A1 | 6/2003 | Sun et al. |
| 2005/0228174 | A1 | 10/2005 | Gillette et al. |
| 2006/0096912 | A1 | 5/2006 | Nussbaumer et al. |
| 2006/0144532 | A1 | 7/2006 | Shaver et al. |
| 2006/0292951 | A1* | 12/2006 | Dutkiewicz ............ D06M 11/00 442/79 |

FOREIGN PATENT DOCUMENTS

| | | |
|---|---|---|
| WO | 9819001 A1 | 5/1998 |
| WO | 9916961 A1 | 4/1999 |
| WO | 2010138941 A2 | 12/2010 |

OTHER PUBLICATIONS

International Search Report and Written Opinion for International Application No. PCT/IB14/001139, dated Sep. 22, 2014, pp. 9.

Pillay, K. P. R., Production of High Tenacity Cotton Yarns by Mercerization, Indian Journal of Textile Research, vol. 2, 1977, pp. 106-112.

Wang et al., "The Effects of Fiber Mercerization on the Properties of Filtration Board," Paper Chemicals 22(2): 10-13 (2010) (with English abstract).

* cited by examiner

HIGH-PERMEABILITY CELLULOSE FIBERS

CROSS-REFERENCE TO RELATED APPLICATIONS

This application is a continuation of U.S. application Ser. No. 14/776,351, filed on Sep. 14, 2015, which is a U.S. National Stage Patent Application under 35 U.S.C. 371 of International Application No. PCT/IB2014/001139, filed on Mar. 14, 2014, which claims priority to U.S. Provisional Patent Application No. 61/800,757 filed Mar. 15, 2013, each of which is hereby incorporated by reference in their entireties for all purposes.

FIELD OF THE INVENTION

The disclosed subject matter relates to mercerized cellulose fibers and processes of making such fibers. In particular, the disclosed subject matter provides curled mercerized cellulose fibers having enhanced fiber strength.

BACKGROUND OF THE INVENTION

The use of cellulosic fibers in a range of consumer products is well known in the art. For example, cellulosic fibers can be used in paper products including bags, tags, toweling, tissue, map papers, paper patterns, napkins, poster papers, filter papers, and in many other grades or uses of paper. Cellulosic fibers are also utilized in structures or components of disposable absorbent products such as diaper liners, diaper wrap sheets, diaper absorbent structures, feminine napkin wrap sheets, disposable hospital bed pads, wipe materials, and the like.

Numerous chemical treatments for preparing cellulose fibers are also known in the art. For example, it is known that cellulose fibers may be treated with concentrated caustic solutions to alter the morphology of the fiber structure in a process referred to as "mercerization." The mercerization process converts cellulose from its native form to a more thermodynamically stable form. Various caustic agents can be used as a mercerizing agent. Techniques for mercerization are described, for example, in Rydholm, ed. *Pulping Processes* (Interscience Publishers, 1965) and Ott, Spurlin and Grafflin, eds., *Cellulose and Cellulose Derivatives*, Vol. v, Part 1 (Interscience Publishers, 1954), the disclosures of which are incorporated by reference herein in their entireties.

Known processes for chemically treating cellulosic fibers typically disperse the cellulosic fibers in a diluent, such as an aqueous solution. However, it has been generally recognized that in order to ensure proper mixing of the cellulosic fibers and the treating chemicals as well as to ease the bulk transport of the treatment mixture, such known processes must have the cellulosic fibers present in the diluents at a low consistency. Such processes therefore generally result in the use of an excess of solvent in which the chemical treatment takes place, or the use of an excess of chemical treatment agent, thereby increasing the costs of manufacturing the chemically treated cellulosic fibers. Additionally, the use of sodium hydroxide, or other caustic agents, typically requires specialized handling procedures as well as recycling processes to ensure that such materials are not discharged to the environment. It is an object of the disclosed subject matter to provide cellulosic fibers which possess improved product properties.

U.S. Pat. No. 5,858,021 to Sun et al. describes a method for treating cellulosic fibers using an alkali metal hydroxide. Either concurrently with or subsequent to the treatment of the cellulosic fibers with an alkali metal hydroxide, the cellulose fibers can be treated with a high-energy refining process to achieve a desired amount of curl. Experimental values of wet curl using the disclosed methods vary between 0.266 and 0.325.

U.S. Pat. No. 6,896,810 to Ali et al. describes systems and methods for subjecting cellulosic fibers to alkaline treatment, which include equipment such as nanofiltration units and slurry concentrators that result in lowered consumption of alkaline solution during alkaline treatment.

U.S. Pat. No. 6,837,970 to Ko et al. describes a method of modifying a two-dimensional, flat fiber morphology of a never-been dried wood pulp into a three-dimensional twisted fiber morphology without the aid of a chemical cross-linker.

SUMMARY OF THE INVENTION

The purpose and advantages of the disclosed subject matter will be set forth in and apparent from the description that follows, as well as the claims hereof and the appended drawings.

The disclosed subject matter relates to methods for making cellulose fibers with improved characteristics, as well as the fibers made using such processes. In accordance with one embodiment of the disclosed subject matter, a mercerized cellulose fiber has an x-ray diffraction coefficient of at least about 0.58 with a curl of at least about 38%, a kink level of at least about 3200 kinks/meter, and a wet tensile of at least about 54 N/cm at 1000 revs PFI refining.

In accordance with one embodiment of the disclosed subject matter, the fibers have a curl of at least about 40%, at least about 42%, or at least about 43%. The kink level of the fibers can be at least about 3300 kinks/meter, at least about 3400 kinks/meter, or at least about 3500 kinks/meter. In accordance with one embodiment of the disclosed subject matter, the x-ray diffraction coefficient can be at least about 0.62, at least about 0.65, or at least about 0.68.

In accordance with one embodiment of the disclosed subject matter, the bulk density of the fibers can be at least about 5.85 cc/g, at least about 6.6 cc/g, at least about 6.7 cc/g, or at least about 6.8 cc/g at 500 revs refining. The wet tensile of the fibers can be at least about 63 N/cm, at least about 65 N/cm, at least about 65.5 N/cm, or at least about 68 N/cm at 1000 revs refining.

In accordance with one embodiment of the disclosed subject matter, the S-10 level can be less than about 4% or less than about 3.4%. The fibers can have a length-weighted fiber length of at least about 2.3 mm. The fibers can have a coarseness of at least about 34.5 mg/100 m.

In accordance with one embodiment of the disclosed subject matter, the fibers have at least about 300 cfm/ft$^2$ air porosity at 500 revs refining. The fibers can have a tensile strength of at least about 110 g/in or at least about 370 g/in at 500 revs refining. The fibers can have a dust level of less than about 12.75%, less than about 9.5%, or less than about 7.0%.

In accordance with embodiments of the disclosed subject matter, the fibers maintain structural integrity.

It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the disclosed subject matter.

DETAILED DESCRIPTION

Figure 1:
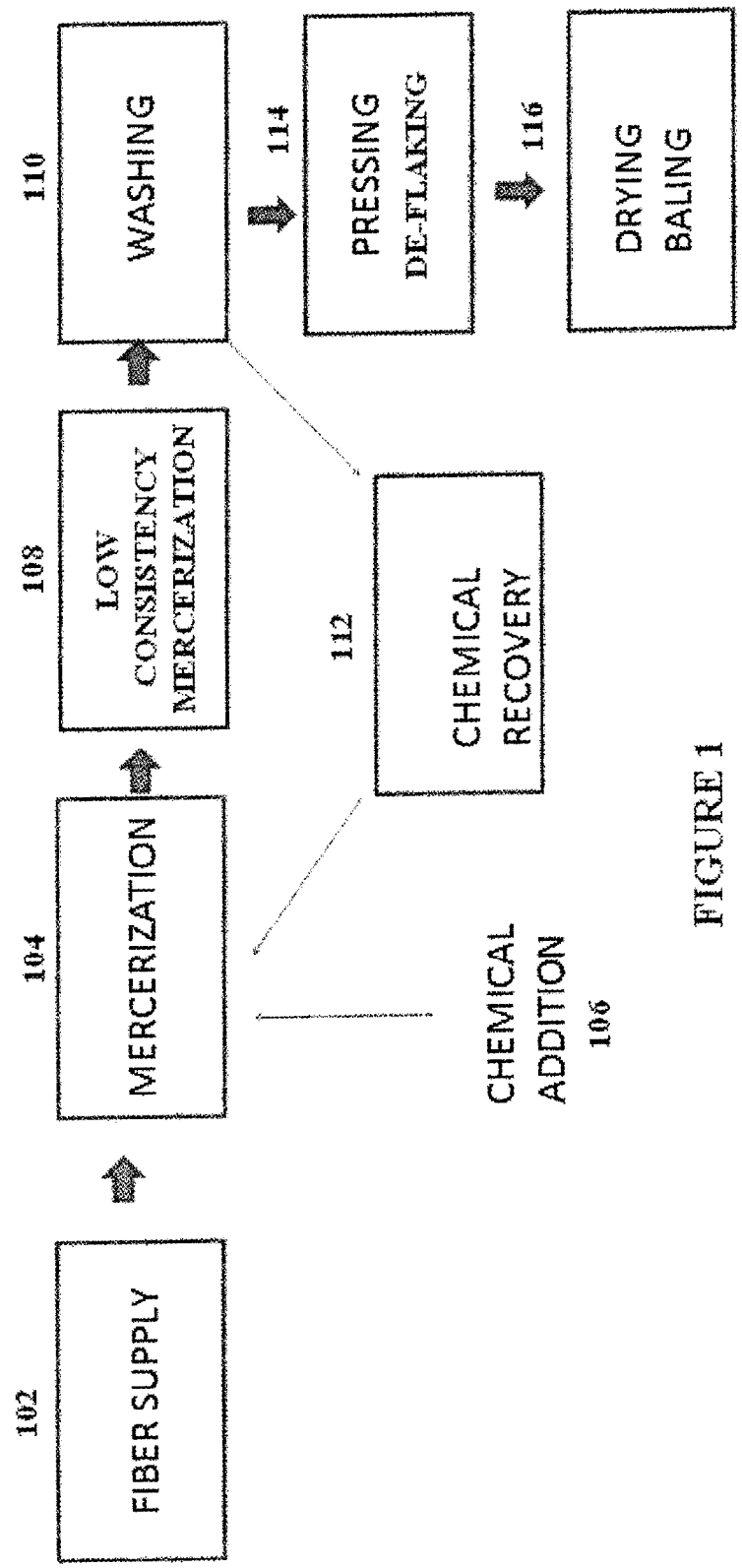
FIG. 1 is a flow diagram showing one embodiment of the process for making fibers in accordance with the disclosed subject matter.

The terms used in this specification generally have their ordinary meanings in the art, within the context of this invention and in the specific context where each term is used. Certain terms are defined below to provide additional guidance in describing the compositions and methods of the disclosed subject matter and how to make and use them.

Definitions

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, or up to 1% of a given value. Alternatively, the term can mean within an order of magnitude, preferably within 5-fold, and more preferably within 2-fold, of a value.

As used herein, the term "cellulose" or "cellulosic" includes any material having cellulose as a major constituent, and specifically, comprising at least 50 percent by weight cellulose or a cellulose derivative. Thus, the term includes cotton, typical wood pulps, cellulose acetate, rayon, thermochemical wood pulp, chemical wood pulp, debonded chemical wood pulp, milkweed floss, microcrystalline cellulose, microfibrillated cellulose, and the like.

As used herein, the term "fiber" or "fibrous" refers to a particulate material wherein the length to diameter ratio of such particulate material is greater than about 10. Conversely, a "nonfiber" or "nonfibrous" material is meant to refer to a particulate material wherein the length to diameter ratio of such particulate matter is about 10 or less.

As used herein, the term "refining" refers to treatment of fibers that causes fractures and fibrillations which aid in imparting strength to resulting applications in which the fibers are used.

As used herein, the term "wet tensile" means wet zero-span tensile strength.

The term "curl change," as used herein, refers to the difference between the wet curl of the unrefined fibers and the wet curl of fibers that have been refined to 500 revs.

The term "consistency" refers to the concentration of the cellulosic fibers present in a mixture. As such, the consistency will be presented as a weight percent representing the weight amount of the cellulosic fibers present in the mixture divided by the total weight amount of cellulosic fibers and water present in such mixture, multiplied by 100.

Mercerization Process

The disclosed subject matter relates to methods for manufacturing mercerized cellulose fibers, as well as fibers produced therefrom. In accordance with one embodiment of the disclosed subject matter, a mercerized cellulose fiber can be prepared by (i) combining cellulose pulp with a mercerization agent to form a slurry, (ii) mechanically treating the slurry, (iii) washing the mercerization agent from the slurry, (iv) adjusting the pH of the slurry, (v) separating the fibers, and (vi) drying the fibers.

Starting Materials

With reference to FIG. 1, a fiber supply is provided at fiber supply stage 102. Any cellulose pulp known in the art can be used as the starting material. Suitable sources of cellulose pulp include, but are not limited to, cotton linters pulps, hardwood cellulose pulps (e.g., hardwood krafts), softwood cellulose pulps (e.g., softwood krafts), sulfite cellulose pulps (e.g., softwood and hardwood sulfites), kraft cellulose pulps, rehydrated cellulose pulps, and any combination of any of the foregoing. Suitable hardwood cellulose pulps include, but are not limited to, southern hemisphere hardwood kraft cellulose pulps, southern hemisphere hardwood sulfite cellulose pulps, Scandinavian hardwood kraft cellulose pulps, Scandinavian hardwood sulfite cellulose pulps, northern hardwood kraft cellulose pulps (NHK), northern hardwood sulfite cellulose pulps, southern hardwood kraft cellulose pulps (SHK), southern hardwood sulfite cellulose pulps, tropical hardwood kraft cellulose pulps, tropical hardwood sulfite cellulose pulps, and any combination of any of the foregoing. Suitable softwood cellulose pulps include, but are not limited to, southern hemisphere softwood kraft cellulose pulps, southern hemisphere softwood sulfite cellulose pulps, Scandinavian softwood kraft cellulose pulps, Scandinavian softwood sulfite cellulose pulps, southern softwood kraft cellulose pulps (SSK), northern softwood craft cellulose pulps (NSK), southern softwood sulfite cellulose pulps (SSS), northern softwood sulfite cellulose pulps (NSS), and any combination of any of the foregoing. Suitable sulfite cellulose pulps include, but are not limited to, southern softwood sulfite cellulose pulps, northern softwood sulfite cellulose pulps, tropical hardwood sulfite cellulose pulps, and any combination of any of the foregoing. For example, cotton linters pulp, softwood sulfite cellulose pulps, and never dried cellulose pulps can be used.

The cellulose pulp can be a mixture of two or more different cellulose pulps. In accordance with one embodiment, the cellulose pulp is not regenerated cellulose pulp. Kraft cellulose pulps which are suitable for the present invention can optionally be prehydrolyzed. Also, the cellulose pulp can be a cellulose floc of any of the aforementioned materials.

The fibrous material can be prepared from its natural state by various pulping processes known in the art including but not limited to chemical, mechanical, thermomechanical (TMP) and chemithermomechanical pulping (CTMP). These industrial processes are described in detail in R. G. Macdonald & J. N. Franklin, *Pulp and Paper Manufacture in 3 volumes; 2nd Edition, Volume* 1: *The Pulping of Wood,* 1969; *Volume* 2: *Control, Secondary Fiber, Structural Board, Coating,* 1969, *Volume* 3: *Papermaking and Paperboard Making,* 1970, The Joint Textbook Committee of the Paper Industry, and in M. J. Kocurek & C. F. B. Stevens, *Pulp and Paper Manufacture, Vol.* 1: *Properties of Fibrous Raw Materials and Their Preparation for Pulping*, The Joint Textbook Committee of the Paper Industry, p. 182 (1983), both of which are hereby incorporated by reference in their entirety. In one embodiment, the fibrous material is prepared by a chemical pulping process, such as a Kraft or sulfite process. Either bleached pulp, which includes fibers that have been delignified to very low levels of lignin, or unbleached Kraft fibers can be selected based on the requirements of a particular application. Due to cost considerations, unbleached Kraft fibers may be selected if alkaline stability is not an issue. Thermomechanical cellulose fiber can also be used. The cellulose fiber for use as a matrix fiber can be derived from a source which is one or more of Southern Softwood Kraft, Northern Softwood Kraft, hardwood, eucalyptus, mechanical, recycle and rayon. In accordance with one embodiment of the disclosed subject matter, the matrix fiber can be derived from Southern Softwood Kraft, Northern Softwood Kraft, or a mixture thereof. For example, the matrix fiber can be Southern Softwood Kraft.

Mercerization Agents

In accordance with one embodiment of the disclosed subject matter, a fiber supply can be mechanically separated so as to obtain fibers that exhibit desired properties prior to mercerization. Alternatively, the wood supply can be chosen based on its physical characteristics. In accordance with one embodiment of the disclosed subject matter, the cellulose pulp can be processed to filter out shorter fibers so as to increase the overall length of the fiber supply to the mercerization stage. For example, a vortex separator can be used to select fibers having the desired geometry. Alternatively, side hill screens, pressure screens, and other mechanical separators can be used as known in the art.

A pulp including the fiber supply can be dewatered to form a slurry cake. For example, the pulp can be dewatered using a screw press. Other dewatering devices can also be used. For example, a deflector and vacuum boxes can be used to assist in the dewatering process. Dewatering can also be accomplished using an extraction press/impress refiner or other dewatering devices as known in the art.

With further reference to FIG. 1, the process then proceeds to the mercerization stage 104. In particular, following dewatering a mercerization agent 106 can be added to the slurry cake to form a slurry. Suitable mercerization agents include, but are not limited to, alkali metal hydroxides, such as sodium hydroxide (NaOH), lithium hydroxide (LiOH), potassium hydroxide (KOH), and rubidium hydroxide (RbOH); benzyltrimethylammonium hydroxide (BTMOH); and any combination of any of the foregoing. The mercerization agent can be cooled to increase the mercerization level.

The cellulose pulp can generally be treated with an aqueous solution having from about 6.5% to about 50% by weight of sodium hydroxide, and alternatively from about 7% to about 24% by weight of sodium hydroxide, based upon 100% weight of total aqueous solution. These values correspond to concentrations of from about 70 to about 764 grams/liter (g/l) of sodium hydroxide and from about 75 to about 300 g/l of sodium hydroxide, respectively. The cellulose pulp may also be treated with an aqueous solution having from about 9% to about 50%, from about 10% to about 50%, from about 13% to about 50%, from about 16% to about 50%, from about 18% to about 50%, from about 9% to about 24%, from about 10% to about 24%, from about 10% to about 17%, from about 13% to about 24%, from about 16% to about 24%, or from about 18% to about 24% by weight of sodium hydroxide, based upon 100% weight of total aqueous solution. Other mercerization agents can be used at the same concentrations. Typically, the cellulose pulp is treated under agitation with the mercerizing agent at a temperature of about 20° C. or higher.

Mercerization can be performed during or after the pulp producing process including during and after digesting, bleaching, purification, and drying. The mercerization step can also be performed on rehydrated cellulose pulp. In accordance with one embodiment of the disclosed subject matter, mercerization is performed during bleaching and/or purification processing during pulp production.

According to another embodiment of the disclosed subject matter, the mercerization is performed in an environment substantially free of oxygen, such as under nitrogen. Oxygen can cause disruptions in the polymer chains resulting in a lower viscosity final product.

Mercerization can be performed in an environment which is substantially free of etherification agents. For example, mercerization can be performed in an environment which contains less than about 0.1% by weight of etherification agent, based upon 100% total weight of cellulose pulp and etherification agent. In accordance with another embodiment of the disclosed subject matter, the mercerization is performed without any etherification agent present.

Mechanical Treatment of the Slurry

The slurry can then be mixed using a dispersion system where the slurry is mechanically treated. The mechanical treatment can accelerate the diffusion of the mercerization agent into the fibers. Devices used in the mechanical pretreatment of the fibers may be one or more of several devices classified in the art as refiners or mixers. The dispersion system can include rotary beaters, double disc refiners, conical refiners, pulpers and high consistency mixers, as well as any other dispersion systems as known in the art.

Referring again to FIG. 1, the slurry can then be subjected to low-consistency mercerization in a low-consistency mercerization stage 108. The low-consistency mercerization agent can be a caustic solution. Suitable caustics include, but are not limited to, alkali metal hydroxides, such as sodium hydroxide (NaOH), lithium hydroxide (LiOH), potassium hydroxide (KOH), and rubidium hydroxide (RbOH); benzyltrimethylammonium hydroxide (BTMOH); and any combination of any of the foregoing. The concentration of the caustic in this stage can be varied. For example, the concentration of the caustic in this stage can be between 5% and 20%, between 10% and 18%, or between 12% and 16%. The concentration of the caustic in this stage can be 12%, 13%, 14%, 15%, or 16%. The low-consistency mercerization can occur in a temperature range below about 200° F., or below about 180° F. For example, the low-consistency mercerization can occur in a temperature range between about 100° F. and about 190° F., or between about 140° F. and about 180°

F. For example, the low-consistency mercerization can occur at about 130° F., about 140° F., about 150° F., about 160° F., about 170° F., or about 180° F. Low-consistency mercerization can serve to extend the mercerization step, which increases the mercerization level and the uniformity of the mercerization.

Washing Stage

The cellulose pulp can be recovered from the mixture of cellulose pulp and mercerization agent, i.e., most or all of the mercerizing agent is removed or neutralized in the mixture. The mercerized cellulose pulp is typically washed and/or neutralized.

With further reference to FIG. 1, the mercerized pulp can be washed at washing stage 110. The mercerized pulp can be washed with, for example, water, a weak acid having a pH of from about 4.0 to about 6.9, a solution having a weak mercerizing agent having a pH of from about 7.1 to about 10.0, or any combination of any of the foregoing. In accordance with one embodiment of the disclosed subject matter, a chemiwasher can be used to wash the slurry. In other embodiments, a multistage drum washer or a continuous digester with displacement washing can be used for washing the slurry.

The mercerization agent may also be neutralized by applying a neutralizing agent to the cellulose pulp. Suitable neutralizing agents include, but are not limited to, sulfuric acid, hydrochloric acid, oxalic acid, sulfur dioxide, phosphoric acid, and any combination of any of the foregoing. The cellulose pulp may be washed and neutralized in any order. Typically, the pulp is neutralized to a pH of from about 6.0 to about 8.0. After the cellulose pulp is neutralized, it can be washed to remove excess salts, such as sodium chloride (NaCl).

With further reference to FIG. 1, the mercerization agent can be recovered during the washing and/or neutralizing steps and recycled for later use at 112.

Adjusting pH

According to an exemplary embodiment, the mercerized cellulose pulp is washed with water. The mercerized cellulose pulp is generally washed with water until the residual water from the pulp has a pH of less than about 10.0 and preferably a pH of from about 5.0 to about 8.0.

The washed and/or neutralized cellulose pulp can contain less than about 4.0% by weight of mercerization agent, based upon 100% weight of cellulose pulp and mercerization agent. In accordance with other embodiments, the washed and/or neutralized cellulose pulp can contain less than about 3.5%, less than about 3.0%, less than about 2.5%, less than about 2.0%, less than about 1.5%, or less than about 1.0% by weight of mercerization agent. The washed and/or neutralized cellulose pulp alternatively contains less than about 0.3%, less than about 0.03%, or less than about 0.02% by weight of mercerization agent, based upon 100% weight of cellulose pulp and mercerization agent.

The slurry can then be discharged from the feed tank and, in accordance with one embodiment of the disclosed subject matter, can be subjected to mechanical treatment. Devices for subjecting the slurry to mechanical treatment include, but are not limited to, rotary beaters, double disc refiners, conical refiners, pulpers and high consistency mixers. In accordance with another embodiment of the disclosed subject matter, no mechanical treatment of the slurry occurs after mercerization. In accordance with other embodiments of the disclosed subject matter, the fibers can be mechanically treated before mercerization.

Separating the Fibers

Referring again to FIG. 1, the slurry can be pressed and de-flaked at pressing and de-flaking stage 114. For example, the slurry can be dewatered after the fibers are mechanically treated or, if no mechanical treatment occurs, following discharge from the feed tank. Dewatering can be accomplished using any dewatering device known in the art, including an extraction press/impress refiner, a screw press, or combinations thereof.

The slurry can then be broken down into individual fibers and small fiber clumps using a de-flaking device. As known in the art, the term "de-flaking device" refers to a device which separates fibrous agglomerates into individual fibers.

Drying the Fibers

With further reference to FIG. 1, the fibers can then be dried and conveyed to a packaging or baling system at drying and baling stage 116. The fibers can be dried using a dryer such as a flash dryer or a tunnel dryer. As known in the art, the term "flash dryer" refers to a dryer employing a thermal drying method in which wet material is exposed to a hot air (or gas) stream at a very short residence time. In accordance with embodiments of the disclosed subject matter, the cellulose pulp can be dried until the cellulose pulp contains less than about 20%, less than about 15%, or less than about 10% by weight of moisture content, based upon 100% weight of total cellulose pulp and water. Drying is typically performed at a temperature of from about 100° C. to about 185° C., or from about 120° C. to about 170° C.

Mercerized Fibers

The mercerized and recovered fibers of the disclosed subject matter have improved properties in comparison to the fibers known in the art. For example, the fibers have properties indicative of effective mercerization, such as high curl and a high X-ray diffraction coefficient. The fibers also have enhanced fiber strength, as indicated by high wet tensile strength. Additional features and characteristics of the fibers in accordance with the disclosed subject matter are described below with reference to specific properties of such fibers.

PFI Refining

Various measurements discussed herein are referred to as "at 500 revs refining" or "at 1000 revs refining." These terms refer to revolutions of PFI refining, which describes the processing of wood pulps by means of the PFI mill to evaluate pulp quality for papermaking. Laboratory beating of the pulp is a widely accepted method of simulating commercial refining practices. Physical testing of laboratory beaten pulps provides significant data that aid in determining the ultimate performance of pulp when converted to paper. In general, a measured amount of pulp at a specified concentration is beaten between a roll with bars and a smooth walled beater housing, both rotating in the same direction but at different peripheral speeds. Beating action is achieved through the differential rotational action and the application of a specified load between the beater roll and housing for a specified number of revolutions.

The process for PFI refining cellulose fibers starts with weighing out a sample containing about 30.0 grams of bone dry pulp. The sample is placed in a beaker and about 1000 mL of water is added. The sample is allowed to soak for at least 8 hours, but must be refined within about 120 hours after the soaking begins.

After the sample has soaked for at least 8 hours, the sample is poured into the receptacle of an appropriate disintegrator as described, for example, in Tappi-205 (available from Testing Machines, Inc., 400 Bayview Ave., N.Y. 11701). Water is added to bring the volume to about 2000±50 mL, using part of the water to wash the remaining sample into the receptacle if necessary. The sample can be disintegrated for an appropriate number of counts such as 600 counts on the counter with the disintegrator operating at an appropriate speed such as 3000 rpm. This is equal to 15,000 revolutions.

After disintegration, the pulp slurry is drained onto a 100 mesh screen. The water is pressed out of the slurry using, e.g., a round Plexiglass disc. The pulp pad is then peeled from the screen and placed in a weighing tray on a tared balance. The weight of the pulp pad is then adjusted by either adding or removing water until the weight of the pulp pad is about 300±1 gram. The sample of pulp in the pad will be at approximately 10% consistency. The sample is then transferred to the beater housing in a PFI mill and distributed as evenly as possible over the wall. No pulp should remain on the bottom of the beater housing. The beater roll is then lowered into the housing and placed in a clamped position. After both the housing and the beater roll have attained full speed, the beater roll is gradually applied. After the required number of revolutions (e.g., 500 or 1000 revolutions), beating is discontinued by removing pressure from the roll. The pulp is then removed from the beater and transferred to a weighing tray on a tared balance.

The target weight for pulp to be used for handsheeting is about 8.45 grams of bone dry pulp. In order to obtain the target weight, some pulp is discarded from the beaten sample prior to handsheeting. In particular, the weight of the refined sample should be multiplied by a factor of about 8.45/30 (or about 0.2817) to reach a target weight. Refined pulp is removed from the weighing tray until the balance weight decreases to the target weight.

The term "at 0 revs refining" refers to pulp that is not refined in the PFI mill. Thus, the bone dry pulp can be weighed directly and used to form handsheets.

Handsheets are then formed from the refined sample (or the 0 revs refining sample). The refined sample is poured into the cup of the disintegrator and sufficient water is added to bring the total volume to about 2000±100 mL. The sample is then disintegrated over an appropriate number of revolutions, e.g., for about 600 counts with the disintegrator operating at about 3000 rpm.

Preparation of the handsheets is started within about 30 minutes of the completion of the disintegration of the pulp and is continued until the handsheets are completely pressed. The disintegrated slurry is poured into a receptacle such as a plastic bucket which is marked at 8000 mL. The slurry is then diluted with water to about 8000±200 mL. An appropriate sheet machine (for example, as described in TAPPI T-205 except that the sheet grid is covered with 150 mesh stainless wire and backed with 20 mesh stainless wire; available from Testing Machines, Inc.) is filled about half full with water. The water is then let out until the level is just above the wire. All of the air should be driven out from below the wire. A sample of about 715±20 mL of the slurry is measured out and poured into the handsheet machine. The water supply is turned on at the same time. Within about 30 seconds after pouring the pulp into the handsheet machine, the mixture is stirred and then allowed to stand for about 10 seconds. The drain valve of the handsheet machine is then fully opened. After the water level drops below the pulp level, the vacuum on the pulp mat is broken by tilting the container. Two sheets of blotter paper can be laid centrally on the pulp sheet on the wire. The brass couch plate can then be laid over the blotters so that the couch plate is centered over the pulp sheet on the wire. The couch roll is placed on the middle of the couch plate and is moved backward to within less than about one quarter inch of the edge of the plate. While maintaining the plate horizontal, the couch roll is rolled back and forth across the couch plate at a constant rate for about 20 seconds. The couch roll is lifted from the center of the couch plate, and the couch plate, both blotters, and the handsheet are removed in such a way that the handsheet sticks to the blotters. The blotters are turned over so that the handsheet is up and the couch plate and the blotter next to the couch plate are removed. A dry blotter is placed into the handsheet press and the couch blotter is set on top of it with the handsheet on top. The handsheet is centered in the press using a press template and a chromium plated drying disc is placed on top of the handsheet. The disc is covered with a dry blotter so that the handsheets can be stacked.

After an appropriate number of handsheets have been sheeted and transferred to the press, a drying disc such as a chromium plated drying disc is placed on top of the top handsheet and covered with a dry blotter. The press cover is placed on the press and the wing nuts are screwed down hand tight so that the cover is parallel to the bottom of the press. The pressure of the press is raised to about 50 PSI±1 PSI in about 30 seconds. The pressure is then held at about 50 PSI for about 5 minutes. The pressure is then released and the press cover is removed. After about 60 seconds, the stack of blotters, handsheets, and drying discs is removed from the press. A dry blotter is placed on the press, a wet blotter is removed from the stack, and the handsheet and drying disc are removed together and placed on the press with the handsheet on top. The handsheet and drying disc are centered on the press using the template. The handsheet is covered with a dry blotter and the procedure is repeated for the remaining handsheets. When the stack is complete, the top handsheet is covered with a blotter and the press cover is placed on the press. The pressure of the press is again raised to about 50 PSI±1 PSI in about 30 seconds. The pressure is then held at about 50 PSI for about 2 minutes. The pressure is then released and the press cover is removed. After about 60 seconds, the stack of blotters, handsheets, and drying discs is removed from the press. The handsheets are ready for drying.

The top blotter is removed. A drying ring is turned so that the side with the rubber gasket is up. The drying disc with the handsheet is placed in the end of the drying ring with the disc on top. The second drying disc and handsheet are placed on top of the first disc with the handsheet on top. A second drying ring is placed on top of the first drying ring and the procedure is repeated. A drying ring is placed on top of the last handsheet. The samples are dried for at least about two hours at about 23±1° C. and about 50±2% relative humidity. After the handsheets have dried, they are removed from the drying rings, and placed in an oven at 110±3° F. for about one hour. The handsheets are then removed from the oven and allowed to condition for about two hours.

X-Ray Diffraction Coefficient

The X-ray diffraction coefficient is measured according to the procedures described below. In general, a sample is de-flaked, conditioned, pressed into a pellet, the pellet placed on a sample holder and in a rotating stage of a X-ray diffractometer, a diffractogram obtained, and the X-ray diffraction coefficient calculated.

A sample of approximately 1.0 g of the pulp is weighed. The pulp is placed in an appropriate blender such as an Osterizer mini-jar and whizzed for an appropriate amount of time, e.g., 10-15 seconds at the grind setting. The pulp is then transferred to an open weigh bottle and placed in an oven at 65±5° C. for 4 to 5 hours. The weigh bottle, with the cap off, is placed into a conditioning cabinet and allowed to equilibrate overnight.

The weigh bottle is then removed from the conditioning cabinet and about 0.17 g of the pulp is formed into a small portion (e.g., a ball or wad). The small portion is placed into a pellet mold, making sure that all of the pulp is inside the cylinder. The pellet mold is placed into an appropriate press such as a Carver press and pressed at about 6000 psi for about 5 minutes, adjusting the pressure as necessary to maintain about 6000 psi. The pellet is then removed from the mold. Any rough edges on the circumference of the pellet are flattened by placing the pellet between two Ryotex plates and pressing at about 6000 psi for about 5 minutes. The pellet is then mounted on a sample holder and covered with a glass slide. The sample holder is then placed onto the sample tower and placed into an appropriate diffraction system such as a PANalytical X'pert Pro X-ray diffraction system for measurement.

The X-ray diffraction coefficient $R_x$ is calculated as:

$$R_x = \frac{2I_{12.02°}}{2I_{12.02°} + I_{15.0°}}$$

where $I_{12.02°}$ is the maxima for Cellulose II and $I_{15.0°}$ is the maxima for Cellulose I.

According to one embodiment of the disclosed subject matter, the mercerized and recovered fibers have an X-ray diffraction coefficient of at least about 0.58, at least about 0.585, at least about 0.59, at least about 0.595, at least about 0.60, at least about 0.605, at least about 0.61, at least about 0.615, at least about 0.62, at least about 0.625, at least about 0.63, at least about 0.635, at least about 0.64, at least about 0.642, at least about 0.644, at least about 0.645, at least about 0.646, at least about 0.648, at least about 0.65, at least about 0.6525, at least about 0.655, at least about 0.6575, at least about 0.66, at least about 0.6625, at least about 0.665, at least about 0.6675, at least about 0.67, at least about 0.672, at least about 0.674, at least about 0.68, at least about 0.685, at least about 0.69, at least about 0.695, at least about 0.70, at least about 0.705, at least about 0.71, at least about 0.715, at least about 0.72, at least about 0.73, at least about 0.74, or at least about 0.75.

Curl

The term curl refers to the ratio of the true contour length L of the fiber divided by the projected length 1 of the fiber minus 1. A curl of zero indicates that no curl is present. To determine the curl, an image analysis method can be used to measure L and 1. Curl can be determined using a Kajaani analyzer as described below.

A sample is torn, not cut, from the pulp sheet. A sample from the whole depth of the sheet, not just from the surfaces, is taken from a homogeneous sample. In accordance with one embodiment, the samples are taken from multiple areas on the pulp sheet. Forceps can be used when obtaining a sample from a bulk pulp or in-process pulp. Using the forceps, small pinches are taken from different areas of the bulk pulp for a representative sample.

The sample is then weighed. In accordance with an exemplary embodiment, about 40-60 fibers should pass through the analyzer per second (or about 20-30 fibers per second for curly fibers) so the longer the fiber, the more of the sample is needed. For example, for long-fibered softwood pulps the bone-dry weight should be about 0.1200-0.1600 grams diluted to about 1 liter. For hardwood pulps and floc the bone-dry weight should be about 0.0500-0.0900 grams diluted to about 1 liter. The bone-dry weight will be entered into the analyzer.

The sample is placed into an appropriate disintegrator such as a Kajaani manual disintegrator (Metso Kajaani FS300) with about 200 mL of filtered (not deionized) water. The sample is allowed to soak for about one hour. The plunger is then moved up and down to disintegrate the fibers completely. The fibers should be inspected to ensure proper separation, and to confirm that no fiber bundles or fiber-to-fiber bonds remain in the sample.

The mixture is poured into an appropriate container such as a 1 liter volumetric flask without losing sample. The volumetric flask is then diluted to volume. The mixture is then shaken and poured into a 1 liter bottle. The 1 liter plastic bottle is then shaken vigorously. The lid is removed and an aliquot of about 100 mL is taken. When taking an aliquot, the dilution must be "stirred continuously," and should not be stirred with a rotary motion because this movement tends to move the longer fibers to the center. The pipette is moved both horizontally and vertically during the sampling. The aliquot is drained into a Kajaani analysis cup/beaker. The beaker is then placed onto the analyzer to run.

In accordance with one embodiment, 3 runs per sample are made. The mixture is poured into a 1 liter plastic bottle with a handle and diluted with filtered water to about 1 liter. The mixture is poured back and forth 5 or more times to a second 1 liter beaker to mix. Immediately after the last mixing pour, approximately 500 mL is poured into the second beaker and diluted to about 1 liter. The mixture is poured back and forth into a third 1 liter beaker. After the last mixing pour, approximately 500 mL is poured into the third beaker and diluted to 1 liter. The mixture is poured back and forth into a plastic Kajaani analysis cup/beaker which is left about one-half to one-quarter full. This is the first run of three to be measured by the Kajaani FS300.

The contents of the third beaker are then poured out. The second beaker is diluted to about 1 liter and poured back and forth into the third beaker. The third beaker should be left about half full on the last pour. The contents of the third beaker are then poured back and forth into a plastic Kajaani cup/beaker which is left about one-half to one-quarter full. This is the second run of three to be measured by the Kajaani FS300. The contents of the second and third beakers are then poured out. The first beaker is diluted to about 1 liter, and the process is repeated using the same steps taken to arrive at the sample used in the second run. This is the third run to be measured by the Kajaani FS300.

In accordance with one embodiment of the disclosed subject matter, the mercerized and recovered fibers have a curl of at least about 38%, at least about 40%, at least about 41%, at least about 41.25%, at least about 41.5%, at least about 41.75%, at least about 42%, at least about 42.5%, at least about 43%, at least about 44%, at least about 45%, at least about 45.5%, at least about 46%, at least about 46.5%, at least about 47%, or at least about 47.5%. After 500 revs refining, the fibers can have a curl of at least about 35%, at least about 37%, at least about 39%, at least about 40%, or at least about 41%. After 1000 revs refining, the fibers can have a curl of at least about 33%, at least about 35%, at least about 36%, at least about 37%, or at least about 38%.

Kink Level

Kink refers to an abrupt change in fiber curvature. Kink is measured by "kink level," which can be calculated based on Kibblewhite's equation. Thus, "kink level" K is generally calculated as:

$$K = \frac{1N_{(10\text{-}20)} + 2N_{(21\text{-}45)} + 3N_{(46\text{-}90)} + 4N_{(91\text{-}180)}}{L_{total}},$$

where N is the number of kinks (e.g., $N_{(46\text{-}90)}$ is the number of kinks having an angle between 46 and 90 degrees) and L is the sum of the fiber lengths. The kink level can be determined using an appropriate analyzer such as a Kajaani analyzer in accordance with the procedures described above in connection with the curl.

In accordance with one embodiment of the disclosed subject matter, the mercerized and recovered fibers have a kink level of at least about 2500 kinks per meter, at least about 2600 kinks per meter, at least about 2700 kinks per meter, at least about 2800 kinks per meter, at least about 2900 kinks per meter, at least about 3000 kinks per meter, at least about 3100 kinks per meter, at least about 3200 kinks per meter, at least about 3250 kinks per meter, at least about 3275 kinks per meter, at least about 3300 kinks per meter, at least about 3325 kinks per meter, at least about 3350 kinks per meter, at least about 3360 kinks per meter, at least about 3370 kinks per meter, at least about 3380 kinks per meter, at least about 3390 kinks per meter, at least about 3400 kinks per meter, at least about 3410 kinks per meter, at least about 3420 kinks per meter, at least about 3430 kinks per meter, at least about 3440 kinks per meter, at least about 3450 kinks per meter, at least about 3475 kinks per meter, at least about 3500 kinks per meter, at least about 3550 kinks per meter, at least about 3600 kinks per meter, at least about 3700 kinks per meter, at least about 3800 kinks per meter, at least about 3900 kinks per meter, at least about 4000 kinks per meter, at least about 4100 kinks per meter, at least about 4300 kinks per meter, or at least about 4500 kinks per meter. After 500 revs refining, the fibers can have a kink level of at least about 2000 kinks per meter, at least about 2100 kinks per meter, at least about 2200 kinks per meter, at least about 2300 kinks per meter, at least about 2400 kinks per meter, at least about 2500 kinks per meter, at least about 2700 kinks per meter, at least about 2900 kinks per meter, at least about 3100 kinks per meter, at least about 3300 kinks per meter, at least about 3500 kinks per meter, or at least about 3700 kinks per meter. After 1000 revs refining, the fibers can have a kink level of at least about 1600 kinks per meter, at least about 1700 kinks per meter, at least about 1800 kinks per meter, at least about 1900 kinks per meter, at least about 2000 kinks per meter, at least about 2100 kinks per meter, at least about 2200 kinks per meter, at least about 2400 kinks per meter, at least about 2600 kinks per meter, at least about 2800 kinks per meter, at least about 3000 kinks per meter, or at least about 3200 kinks per meter.

Wet Tensile Strength

Wet tensile strength refers to wet zero-span tensile strength. Unless otherwise specified, wet tensile strength refers to the wet tensile at 1000 revs refining. Wet tensile strength can be measured in accordance with appropriate procedures as described in, for example, TAPPI method T231.

In accordance with one embodiment of the disclosed subject matter, the mercerized and recovered fibers have a wet tensile strength of at least about 54 N/cm, at least about 54.5 N/cm, at least about 55 N/cm, at least about 56 N/cm, at least about 57 N/cm, at least about 58 N/cm, at least about 59 N/cm, at least about 60 N/cm, at least about 61 N/cm, at least about 62 N/cm, at least about 63 N/cm, at least about 64 N/cm, at least about 64.5 N/cm, at least about 65 N/cm, at least about 65.5 N/cm, at least about 66 N/cm, at least about 67 N/cm, at least about 68 N/cm, or at least about 69 N/cm, at least about 70 N/cm, at least about 72 N/cm, at least about 74 N/cm, at least about 76 N/cm, at least about 78 N/cm, at least about 80 N/cm, or at least about 82 N/cm.

Length-Weighted Fiber Length

The term "length weighted fiber length" means the length-weighted mean of the fibers between 0.25 mm and 7.6 mm according to the following equation:

$$\ell_{fw} = \frac{\sum_i n_i \ell_i^2}{\sum_i n_i \ell_i},$$

where fibers are grouped into various length classes and $n_i$ is the number of fibers in the length class $l_i$. Length-weighted fiber length can be measured using an appropriate analyzer such as the Kajaani analyzer in accordance with the procedures described above in connection with the curl except that a larger sample (e.g., 0.5-0.7 g) can be taken. The disintegration procedures described above in connection with the curl are used.

The length weighted fiber average can depend upon the length of the fibers used in the disclosed process. For example, in accordance with certain embodiments of the disclosed subject matter, the mercerized and recovered fibers can have a length-weighted fiber length of at least about 1.9 mm, at least about 1.95 mm, at least about 2.0 mm, at least about 2.05 mm, at least about 2.1 mm, at least about 2.15 mm, at least about 2.2 mm, at least about 2.25 mm, at least about 2.3 mm, at least about 2.35 mm, at least about 2.4 mm, at least about 2.45 mm, at least about 2.5 mm, or at least about 2.6 mm.

Air Porosity

For purposes of this disclosure, the terms "air porosity" and "air permeability" will be used interchangeably. In order to measure air porosity, all pulp samples are wetted and soaked, then slurried, disintegrated and couched (formed) into handsheets before testing. Handsheets are prepared that contain between about 1.21 to about 1.37 grams of bone dry pulp. To prepare handsheets pulp samples are slurried, disintegrated and then couched under specified conditions onto polished drying discs. The handsheets are dried under drying rings and then conditioned in an environment that will bring them to the moisture content that is obtained by coming to equilibrium in an area maintained at about 23° C. (about 73.4° F.) and 50% relative humidity when approached from a moisture content less than this equilibrium moisture. The conditioned handsheets should have a basis weight of about 64 grams per square meter (approximately the same as 60 grams per square meter bone dry basis weight specified in TAPPI-T205). The sheets are then individually weighed, measured for thickness (mm), porosity (cfm/ft$^2$) and tensile strength (g/in). In measuring porosity, air is forced through the sheet at a constant pressure drop, through a standard sized orifice. The amount of air which moves through the sheet is measured in cfm/ft$^2$.

In order to test air porosity and tensile strength, handsheets are prepared. A sample containing about 8.45 grams of bone dry pulp is weighed. The sample containing about 8.45 grams of bone dry pulp can be obtained either by removing pulp from the original 30 grams of bone dry pulp sample as discussed above in connection with the description of PFI refining, or by measuring it directly where no refining is necessary. About 500 mL of water is then added to the sample. The sample is allowed to soak for at least eight hours, but testing should occur no more than about 120 hours after starting to soak. Soaking can be omitted if the sample was refined in a PFI mill as described above.

Handsheets are then prepared as described above in connection with the description of PFI refining.

Each handsheet is weighed and the weight is recorded. An individual "as is" handsheet can weigh about 1.21 to about 1.37 grams. The four handsheets closest to the target range are selected for physical testing. For each handsheet selected, the thickness (in mm) is measured at four random locations away from the edge of the sheet using an appropriate device for measuring thickness such as a Thwing-Albert ProGage automated thickness tester. Each thickness measurement and the average thickness are selected. Before measuring the air porosity, a strip of approximately 1 inch is cut from each individual handsheet for tensile strength measurement. The larger remaining piece of handsheet is used to measure air porosity.

The test area of 38 cm$^2$, the test pressure of 125 Pa, and the unit of measure cfm/ft$^2$ are selected in accordance with the test standard ASTM D-737. Air porosity is measured using an appropriate device such as the Textest FX 3300 instrument. The test specimen is placed across the test head, and the test points are placed evenly and diagonally over the sample. The test results are recorded.

The average of the four air porosity values (one per handsheet) is then calculated. In order to obtain the air porosity, the average is multiplied by the appropriate basis weight correction factor for the sum of the weights of the four handsheets. In particular, the basis weight correction factor is the sum of the weights of the four handsheets divided by 4.965 grams.

In accordance with one embodiment of the disclosed subject matter, the mercerized and recovered fibers have an air porosity of at least about 360 cfm/ft$^2$, at least about 370 cfm/ft$^2$, at least about 380 cfm/ft$^2$, at least about 390 cfm/ft$^2$, at least about 400 cfm/ft$^2$, at least about 410 cfm/ft$^2$, at least about 420 cfm/ft$^2$, at least about 430 cfm/ft$^2$, at least about 440 cfm/ft$^2$, at least about 450 cfm/ft$^2$, at least about 460 cfm/ft$^2$, at least about 470 cfm/ft$^2$, at least about 480 cfm/ft$^2$, or at least about 490 cfm/ft$^2$ at 0 revs refining. In accordance with one embodiment of the disclosed subject matter, the mercerized and recovered fibers have an air porosity of at least about 280 cfm/ft$^2$, at least about 290 cfm/ft$^2$, at least about 300 cfm/ft$^2$, at least about 310 cfm/ft$^2$, at least about 320 cfm/ft$^2$, at least about 340 cfm/ft$^2$, or at least about 370 cfm/ft$^2$ at 500 revs refining. In accordance with one embodiment of the disclosed subject matter, the mercerized and recovered fibers have an air porosity of at least about 260 cfm/ft$^2$, at least about 280 cfm/ft$^2$, at least about 300 cfm/ft$^2$, at least about 320 cfm/ft$^2$, at least about 330 cfm/ft$^2$, at least about 340 cfm/ft$^2$, or at least about 350 cfm/ft$^2$ at 1000 revs refining.

Tensile Strength

Tensile strength is measured using the procedures described above in connection with the air porosity. Samples of the handsheets are measured using an appropriate device such as the Thwing-Albert EJA Vantage Instrument.

In accordance with one embodiment of the disclosed subject matter, the mercerized and recovered fibers have a tensile strength of at least about 20 g/in, at least about 30 g/in, at least about 45 g/in, at least about 55 g/in, at least about 60 g/in, at least about 65 g/in, at least about 75 g/in, at least about 85 g/in, at least about 90 g/in, at least about 95 g/in, at least about 100 g/in, at least about 150 g/in, or at least about 200 g/in at 0 revs refining. At 500 revs refining, the fibers can have a tensile strength of at least about 110 g/in, at least about 150 g/in, at least about 180 g/in, at least about 190 g/in, at least about 200 g/in, at least about 225 g/in, at least about 250 g/in, at least about 275 g/in, at least about 300 g/in, at least about 310 g/in, at least about 320 g/in, at least about 330 g/in, at least about 340 g/in, at least about 350 g/in, at least about 360 g/in, at least about 370 g/in, at least about 380 g/in, at least about 390 g/in, at least about 400 g/in, at least about 410 g/in, at least about 420 g/in, at least about 430 g/in, at least about 440 g/in, at least about 450 g/in, at least about 500 g/in, or at least about 550 g/in. At 1000 revs refining, the fibers can have a tensile strength of at least about 225 g/in, at least about 250 g/in, at least about 300 g/in, at least about 320 g/in, at least about 330 g/in, at least about 340 g/in, at least about 360 g/in, at least about 380 g/in, at least about 400 g/in, at least about 450 g/in, at least about 460 g/in, at least about 500 g/in, at least about 550 g/in, at least about 600 g/in, at least about 700 g/in, or at least about 800 g/in.

Bulk Density

Bulk density can be measured using the procedures described above in connection with air porosity. Bulk density is defined as:

$$\text{Bulk} = \frac{1}{\text{Density}}$$

The density can be calculated based on the average weight, area, and thickness of the handsheets described above in connection with air porosity. Thus, bulk density can be defined as:

$$\text{Bulk} = \frac{\text{Thickness} \times \text{Area}}{\text{Weight}}$$

In accordance with one embodiment of the disclosed subject matter, the mercerized and recovered fibers have a bulk density of at least about 6.0 cc/g, at least about 6.2 cc/g, at least about 6.4 cc/g, at least about 6.5 cc/g, at least about 6.7 cc/g, at least about 6.8 cc/g, at least about 6.9 cc/g, at least about 7.0 cc/g, at least about 7.05 cc/g, at least about 7.1 cc/g, at least about 7.2 cc/g, at least about 7.3 cc/g, at least about 7.4 cc/g, at least about 7.5 cc/g, at least about 7.6 cc/g, at least about 7.7 cc/g, at least about 7.75 cc/g, at least about 7.8 cc/g, at least about 7.85 cc/g, or at least about 7.9 cc/g. At 500 revs refining, the fibers can have a bulk density of at least about 5.8 cc/g, at least about 5.85 cc/g, at least about 5.9 cc/g, at least about 5.95 cc/g, at least about 6 cc/g, at least about 6.05 cc/g, at least about 6.1 cc/g, at least about 6.15 cc/g, at least about 6.2 cc/g, at least about 6.25 cc/g, at least about 6.3 cc/g, at least about 6.4 cc/g, at least about 6.5 cc/g, at least about 6.6 cc/g, at least about 6.65 cc/g, at least about 6.7 cc/g, at least about 6.8 cc/g, at least about 6.9 cc/g, at least about 7.0 cc/g, or at least about 7.1 cc/g. At 1000 revs refining, the fibers can have a bulk density of at least about 5.6 cc/g, at least about 5.7 cc/g, at least about 5.9 cc/g, at least about 6.0 cc/g, at least about 6.1 cc/g, at least about 6.2 cc/g, at least about 6.3 cc/g, at least about 6.4 cc/g, at least about 6.5 cc/g, at least about 6.6 cc/g, at least about 6.7 cc/g, or at least about 6.75 cc/g.

Water Retention Value

Water retention value (WRV) is a measure of the water retained by a wet pulp specimen after centrifuging under standard conditions. In order to measure the WRV, prepared samples are soaked in deionized water for about 16 to 24 hours. A portion of the swollen sample is transferred to an appropriate centrifuging device such as a special centrifuge tube and centrifuging is carried out at an acceleration of about 1,500 gravities for about 10 minutes. The moist, centrifuged sample is weighed, dried at about 105±2° C. and reweighed. WRV is reported as a percentage. Not all surface or occluded water is removed during centrifuging; therefore, for WRV determinations to be comparable, standardized conditions should be maintained.

On the first day, the sample is weighed and soaked. For a dry sample, the sample is shredded in order to increase the surface area. The sample is subdivided, by hand, into the smallest pieces possible. Wet samples are used "as is." A few grams of the sample is placed in an appropriate container such as a 250 mL Erlenmeyer flask. Deionized water in an amount of about 100 mL is added to the sample and the sample is shaken vigorously. The sample is allowed to soak overnight. In addition, weighing bottles should be conditioned overnight in an oven at about 105±2° C.

On the second day, the weighing bottles are removed from the oven and placed in a desiccator to cool for about one hour. The bottles are weighed before centrifuging. Using tweezers, the centrifuge funnel can be filled approximately three-quarters full with the sample. Excess packing should be avoided. The funnel filled with the sample is placed into the centrifuge tube. Additional centrifuge funnels should be filled and placed in the centrifuge tube as described until the sample is depleted. The samples are centrifuged for a total time of about 10 minutes. The samples are removed and rapidly transferred into tared weighed bottles and reweighed. The samples are then placed in an oven overnight at about 105±2° C.

On the third day, the samples are removed from the oven, cooled in a desiccator for one hour, and reweighed.

WRV values are calculated as:

$$WRV = \frac{W_W - W_D}{W_D}$$

where $W_W$ is the weight of the wet centrifuged sample and $W_D$ is the weight of the dry sample. WRV is reported as a percentage.

In accordance with one embodiment of the disclosed subject matter, the mercerized and recovered fibers have a water retention value of between about 100% and about 70%, between about 96% and about 73%, between about 95% and about 75%, or between about 80% and about 90%. For example, the mercerized and recovered fibers can have a water retention value of less than about 96%, less than about 94%, less than about 92%, less than about 90%, less than about 89%, less than about 88%, or less than about 87%.

S-10

In order to measure the S-10 value, pulp is steeped in sodium hydroxide at a specified concentration for about 1 hour at about 20° C. The cellulose may not become soluble, but lower molecular weight compounds in the sample become soluble in the sodium hydroxide solution (i.e.—the low molecular weight compounds are extracted from the sample into the solution). The sample is filtered to separate the cellulose from the filtrate. The amount of soluble compounds is determined by oxidization with dichromate. A known concentration of sodium dichromate is allowed to react with an aliquot of the filtered, steeped caustic. The amount of dichromate consumed in the reaction is directly related to the amount of soluble (extracted) material.

First, the pulp extracts are prepared. The samples should be conditioned in the area where the moisture determination and weighing are made for at least about two hours. The moisture of a group of the samples is determined according to methods known in the art, such as TAPPI T-412, TAPPI T-550, or ANLY-341 (Buckeye Technologies Inc.). Enough air dry sample is weighed to give about 1.50±0.01 grams dry pulp. The sample is then torn into approximately one half inch squares. The pieces of sample should represent the entire thickness of the sheet. The weighed sample is then transferred to a 250 mL beaker.

Sodium hydroxide solutions are used to extract the pulp. The NaOH solutions are pre-cooled to about 20.0±0.02° C. Sodium hydroxide solution in the amount of approximately 150 mL at the desired concentration is measured using either a graduated cylinder or a bottle top dispenser. The desired concentration can be, for example, about 10%, about 18%, or about 21.5%. After dispensing the NaOH solution on the pulp sample immediately start the timer. The pulp is allowed to swell for about two minutes±five seconds. The pulp sheet is then disintegrated by stirring with a mechanical stirrer for about 3 minutes±5 seconds on all samples except V-60 (about 4 minutes). After disintegration, the mechanical stirrer is removed, the cellulose from the stirrer is added back to the beaker, and the beaker is covered and allowed to soak.

After the sample has soaked for about one hour±five seconds, the beaker is removed from the bath. The slurry is filtered through an appropriate filter such as a coarse fritted glass crucible using a suction flask. When applying suction, air should not be pulled through the filter. The filtrate is then recycled through the cellulose mat twice in order to remove microscopic fines from the filtrate. While pouring the collected filtrate through the mat the third time, the first 30 mL is discarded and the remainder is retained.

A cellulose standard solution is prepared on the day of testing. Acetate grade cotton linter cellulose (e.g., Buckeye 1AY500) is allowed to come to a moisture equilibrium and stored in an air-tight container. When moisture equilibrium is reached, the moisture is determined according to an appropriate method as known in the art such as TAPPI T-412, TAPPI T-550, or ANLY-341 (Buckeye Technologies Inc.). Sample is weighed to give about 0.200±0.004 g dry cellulose and is dissolved in about 72% $H_2SO_4$. The dissolved sample is then quantitatively transferred to a 100 mL volumetric flask, diluted to volume with about 72% $H_2SO_4$, and mixed thoroughly.

Diluted NaOH solutions are created by mixing NaOH at the desired concentration (e.g., 10, 18, or 21.5%) and millipore water in the ratio of about 10:40 for each. These solutions are used to prepare duplicates of the blank and standard. In accordance with one embodiment, blanks are about 50 mL diluted 10.0% NaOH, about 50 mL diluted 18.0% NaOH, and about 50 mL diluted 21.5% NaOH. Standard is about 48 mL diluted 10.0% (18.0% or 21.5%) NaOH and about 2 mL standard cellulose solution. The solutions are prepared in appropriate containers such as 500 mL Erlenmeyer flasks. A few plain Hengar granules (e.g., about 4-5 granules) are dropped into each flask. Standard dichromate solution in an amount of about 2 mL and about 50 mL concentrated $H_2SO_4$ are dispensed into each flask using an appropriate titrator such as the Mettler Toledo T50 autotitrator (Mettler-Toledo International, Inc., Columbus, Ohio). The solutions are heated at the boiling point under a reflux condenser for about 10 minutes and then allowed to cool enough so that the flask may be handled safely. The solutions are then titrated with ferrous ammonium sulfate. Duplicate titrations should agree to about 0.3 mL. To account for changes in, e.g., chemical strengths, standardization should be repeated with each set of samples. The concentration of ferrous ammonium sulfate is defined as:

$$C = \frac{W}{B-S}$$

where C is the concentration of ferrous ammonium sulfate in grams cellulose per milliliter, W is grams cellulose in 2 mL cellulose standard solution (usually 0.004 grams), B is mL ferrous ammonium sulfate required to titrate the blank, and S is mL ferrous ammonium sulfate required to titrate 2 mL cellulose standard solution after oxidation with same volume of dichromate used in blank. In some cases, 2 mL of dichromate solution may not be adequate to oxidize all of the soluble material extracted from the pulp. In such cases, blanks and sample titrations should be repeated with about 4 mL of dichromate reagent.

For the pulp samples, an aliquot is pipetted into an Erlenmeyer flask. The size of the aliquot can vary. For extracted grades, an aliquot of about 10 mL is used. For paper grades, an aliquot of about 2 mL is used. Millipore water is added to the flask to bring the volume to about 50 mL. A few plain Hengar granules (e.g., about 4-5 granules) are dropped into each flask. Standard dichromate solution in an amount of about 2 mL and about 50 mL concentrated $H_2SO_4$ are dispensed into each flask using the autotitrator. The solutions are heated at the boiling point under a reflux condenser for about 10 minutes and then allowed to cool enough so that the flask may be handled safely. The solutions are then titrated with ferrous ammonium sulfate. Duplicate titrations should agree to about 0.3 mL.

The S-10 level is defined as:

$$\% S = \frac{\frac{150 mL ExtractionVolume}{mL AliquotVolume}(B - A \times C)}{DryWeightSample} \times 100$$

where A is the sample titration (average of the two), B is the blank titration (average of the two), C is the concentration of ferrous ammonium sulfate in grams cellulose per milliliter, and S is the mL of ferrous ammonium sulfate required to titrate 2 mL cellulose standard solution after oxidation with the same volume of dichromate used in the blank.

In accordance with one embodiment of the disclosed subject matter, the mercerized and recovered fibers have a S-10 level of less than about 6.0%, less than about 5.0%, less than about 4.0%, less than about 3.85%, less than about 3.75%, less than about 3.6%, less than about 3.5%, less than about 3.4%, less than about 3.25%, or less than about 3.0%.

Dust Level

The measurement of dust level is used to estimate the potential fiber loss in a filtration customer's process with mercerizes fibers. Typically bulk products have more dust than sheeted products. Dust can be found in three locations within the customer's process: offline coating, at the slitters, and in the pleating process for filters. This procedure is used to determine the amount of Dusting (% fiber loss) associated with sheeted fibers. The standard number of samples for this procedure is to run an "n" of 3.

Samples are prepared by cutting a Williams handsheet and/or drylap (sheeted fibers) into an 11" md×8" cd sheet. The sheet is weighed. Strips are cut about every one half inch parallel to the cross machine direction. The resulting strips are cut into about one half inch lengths. All of the rectangles that have been formed are weighed.

The diced pieces are placed inside a testing sieve such as U.S.A. Standard Testing Sieve, No. 14 (1.40 mm, 0.055 in. opening). The sieve with the fiber is placed on a tester such as an Automated DE tester. The cover lid is placed on the sieve. A vacuum is activated. Immediately after activating the vacuum, the air valve to the agitation nozzles is opened. The stopwatch is started immediately after the air valve is opened. After about 10 minutes during which the vacuum is maintained at 3.0 centimeters of Hg, the agitation nozzle airflow is stopped and the vacuum supply is deactivated. The diced fiber on the top of the sieve screen is removed and weighed.

For each sample, the initial sample weight and the sample weight after about 10 minutes of vacuum and agitation should be recorded. The dust level (or percent fiber loss) can be calculated as:

$$DustLevel = \frac{InitialWeight - FinalWeight}{InitialWeight} \times 100$$

In accordance with one embodiment of the disclosed subject matter, the mercerized and recovered fibers have a dust level of less than about 13.5%, less than about 12.75%, less than about 12%, less than about 11.5%, less than about 11%, less than about 10.5%, less than about 10%, less than about 9.75%, less than about 9.5%, less than about 9.25%, less than about 9%, less than about 8.75%, less than about 8.5%, less than about 7.5%, less than about 7.0%, less than about 6.5%, or less than about 6.0%.

Curl Change

Curl change is calculated as:

$$CurlChange = \frac{Curl_{unrefined} - Curl@500revs}{Curl_{unrefined}}$$

In accordance with one embodiment of the disclosed subject matter, the mercerized and recovered fibers have a curl change upon refining at 500 revs of at least about 14%, at least about 16%, at least about 18%, at least about 19%, at least about 19.5%, at least about 19.75%, at least about 20%, at least about 21%, at least about 22%, or at least about 22.25%.

Coarseness

The coarseness can be measured using an appropriate analyzer such as the Kajaani analyzer as described above in connection with the curl. In ensuring that the fibers are properly separated, two pairs of sharp-tipped forceps can be used to gently pull the fibers apart if nits exist.

The coarseness can depend upon the fibers used in the disclosed process. For example, in accordance with certain embodiments of the disclosed subject matter, the mercerized and recovered fibers have a coarseness of at least about 33.0%, at least about 34.0%, at least about 34.5 mg/100 m, at least about 34.75 mg/100 m, at least about 35 mg/100 m, at least about 35.25 mg/100 m, or at least about 35.5 mg/100 m.

Percent Fines

The percent fines can be measured using an appropriate analyzer such as the Kajaani analyzer as described above in connection with the curl.

The percent fines can depend upon the fibers used in the disclosed process. For example, in accordance with certain embodiments of the disclosed subject matter, the mercerized and recovered fibers have a percent fines of less than about 4.6%, less than about 4.0%, less than about 3.5%, less than about 3.0%, less than about 2.90%, less than about 2.80%, less than about 2.70%, less than about 2.65%, less than about 2.60%, less than about 2.55%, less than about 2.50%, less than about 2.40%, less than about 2.30%, or less than about 2.20%.

Elongation

The elongation can be measured using an appropriate analyzer such as the Kajaani analyzer as described above in connection with the curl. The elongation is measured at peak.

The elongation can depend upon the fibers used in the disclosed process. For example, in accordance with certain embodiments of the disclosed subject matter, the mercerized and recovered fibers have an elongation upon refining at 500 revs of at least about 1.30%, at least about 1.50%, at least about 1.75%, at least about 2%, at least about 2.25%, at least about 2.50%, or at least about 2.75%, at least about 3.0%, at least about 4.0%, at least about 5.0%, at least about 6.0%, or at least about 6.8%.

Applications

Fibers in accordance with the disclosed subject matter can be used for any fiber application known in the art. For example, the fibers can be used in paper products including bags, tags, toweling, tissue, map papers, paper patterns, napkins, poster papers, filter papers, and in many other grades or uses of paper. The fibers can also be used in structures or components of disposable absorbent products such as diaper liners, diaper wrap sheets, diaper absorbent structures, feminine napkin wrap sheets, disposable hospital bed pads, and the like. The fibers can also be used in the textile industry for manufacturing upholstery, curtains, blankets, and clothing.

The fibers can also be incorporated into various thermoplastic products. The thermoplastics can be used to form automotive parts, office furniture, household goods and kitchenware, appliances, industrial goods, and consumer personal goods.

EXAMPLES

The presently disclosed subject matter will be better understood by reference to the following Examples, which are provided as exemplary of the invention, and not by way of limitation.

Example 1

Fibers in accordance with the disclosed subject matter were prepared both in the laboratory (Experimental Fibers) and in a commercial setting (Semiworks Fibers). For purposes of comparison, known sheeted and bulk fibers (Control Fibers) were also prepared.

Control Fibers

In order to determine the properties of cellulose fibers prepared according to embodiments of the disclosed subject matter, test materials were prepared. First, control fibers were prepared as follows:

Control fiber 1 is a never-dried, bleached, Southern softwood Kraft pulp that was mercerized during cold caustic extraction, washed, further bleached and then formed into a sheet on a paper machine.

Control fiber 2 is a never-dried, bleached, Southern softwood Kraft pulp that was mercerized in a high consistency process, followed by continued mercerization at lower consistency, washed, adjusted to slightly acidic pH, pressed to high consistency, de-flaked, followed by drying and then baling.

Physical properties of the control fibers are illustrated in Table 1.

TABLE 1

| | | | Commercially Available Sheeted Mercerized Product avg/stdev (n) | Commercially Available Bulk Mercerized Product avg/stdev (n) |
|---|---|---|---|---|
| Fiber Data | Fiber Length, Wt. Avg | mm | 2.54/.10 (15) | 2.09/.16 (9) |
| | Fines | % | 3.08/.14 (15) | 3.69/.50 (9) |
| | Fiber Width | um | 27.1/1.0 (15) | 29.2/.7 (9) |
| | Coarseness | mg/100 m | 33.5 | 40.3 (1) |
| | Curl | % | 40.0/.5 (15) | 47.7/.8 (9) |
| | Kink | 1/m | 2670/61 (15) | 4397/57 (9) |
| Handsheet Properties | Air Permeability, 0 revs | cfm/ft$^2$ | 333/11 (83) | 467/34 (50) |
| | Air Permeability, 500 revs | cfm/ft$^2$ | 334/12 (80) | 365/13 (50) |
| | Air Permeability, 1000 revs | cfm/ft$^2$ | 332/20 (81) | 337/11 (50) |
| | Tensile, 0 revs | g/in | 70/9 (83) | 32/8 (50) |
| | Tensile, 500 revs | g/in | 183/20 (80) | 204/26 (50) |
| | Tensile, | g/in | 313/38 (81) | 408/52 (50) |

TABLE 1-continued

|  |  |  | Commercially Available Sheeted Mercerized Product avg/stdev (n) | Commercially Available Bulk Mercerized Product avg/stdev (n) |
|---|---|---|---|---|
|  | 1000 revs |  |  |  |
|  | Bulk, 0 revs | cc/g | 6.12/.13 (83) | 7.70/.34 (50) |
|  | Bulk, 500 revs | cc/g | 6.40/.16 (80) | 6.69/.23 (50) |
|  | Bulk, 1000 revs | cc/g | 6.35/.4 (81) | 6.37/.22 (50) |
|  | Elongation, 0 revs | % Peak | 4.86/.50 (27) | 12.50/.96 (17) |
|  | Elongation, 500 revs | % Peak | 2.00/.36 (27) | 2.63/.41 (18) |
|  | Elongation, 1000 revs | % Peak | 1.56/.11 (27) | 2.16/.19 (18) |
|  | Length, Wt Avg, 0 revs | mm | 2.53 | 2.11 |
|  | Length, Wt Avg, 500 revs | mm | 2.62 | 2.36 |
|  | Length, Wt Avg, 1000 revs | mm | 2.64 | 2.44 |
|  | Curl, 0 revs | % | 38.4 | 47.0 |
|  | Curl, 500 revs | % | 32.7 | 40.5 |
|  | Curl, 1000 revs | % | 30.8 | 38.3 |
|  | Kink, 0 revs | 1/m | 2680 | 4464 |
|  | Kink, 500 revs | 1/m | 2132 | 3652 |
|  | Kink, 1000 revs | 1/m | — | 3334 |
| Additional Data | WRV | % | 80.7/1.2 (25) | 79.1/1.3 (16) |
|  | Wet ZST @ 1000 PFI Mill revs | N/cm | 64.9/1.1 (12) | 54.4/1.2 (7) |
|  | Mercerization Level | Rx Value | 0.65/.01 (18) | 0.62/.01 (13) |
|  | S-10 | % | 3.12/.13 (13) | 4.36/.38 (11) |
|  | Dust | % | 10.4/1.4 (22) | 10.4/1.7 (15) |

Differences between control fiber 1 and control fiber 2 are illustrated in Table 1. Table 1 also shows the standard deviations of certain properties of the control fibers.

Some of the differences between the control fibers can be attributed to the inherent properties of sheeted fibers versus bulk fibers and the differences in the mercerization process. For example, sheeted fibers such as control fiber 1 are generally stronger than bulk fibers such as control fiber 2. Strength can be measured by wet zero span tensile strength. As shown in Table 1, the sheeted fiber (control fiber 1) has a wet tensile of 64.9 N/cm at 1000 revs refining. In contrast, the bulk fiber (control fiber 2) has a wet tensile of 54.4 N/cm at 1000 revs refining. This is a significant difference where the standard deviation is in the range of 1.1 or 1.2 N/cm.

In contrast, bulk fibers such as control fiber 2 generally have a higher air permeability than sheeted fibers such as control fiber 1. As illustrated in Table 1, the bulk fiber (control fiber 2) has an air permeability of 467 cfm/ft$^2$ at 0 revs refining, whereas the sheeted fiber (fiber 1) has an air permeability of 333 cfm/ft$^2$. Even given the large standard deviation, this difference is significant. Bulk fibers such as control fiber 2 also tend to have a higher curl and kink level than sheeted fibers such as control fiber 1. For example, control fiber 2 has a curl of 47.7% while control fiber 1 has a curl of 40.0%. Similarly, control fiber 2 has a kink level of 4397 kinks per meter, while control fiber 1 has a kink level of 2670 kinks per meter.

Each of these properties depends, to some extent, on the other properties. In particular, the characteristics of each of the bulk and sheeted fibers described in Table 1 reflect the method in which the fibers were processed. Further processing of the fibers is available. However, such processing will affect all of the characteristics of these fibers, not just the characteristic of interest.

Figure 2:
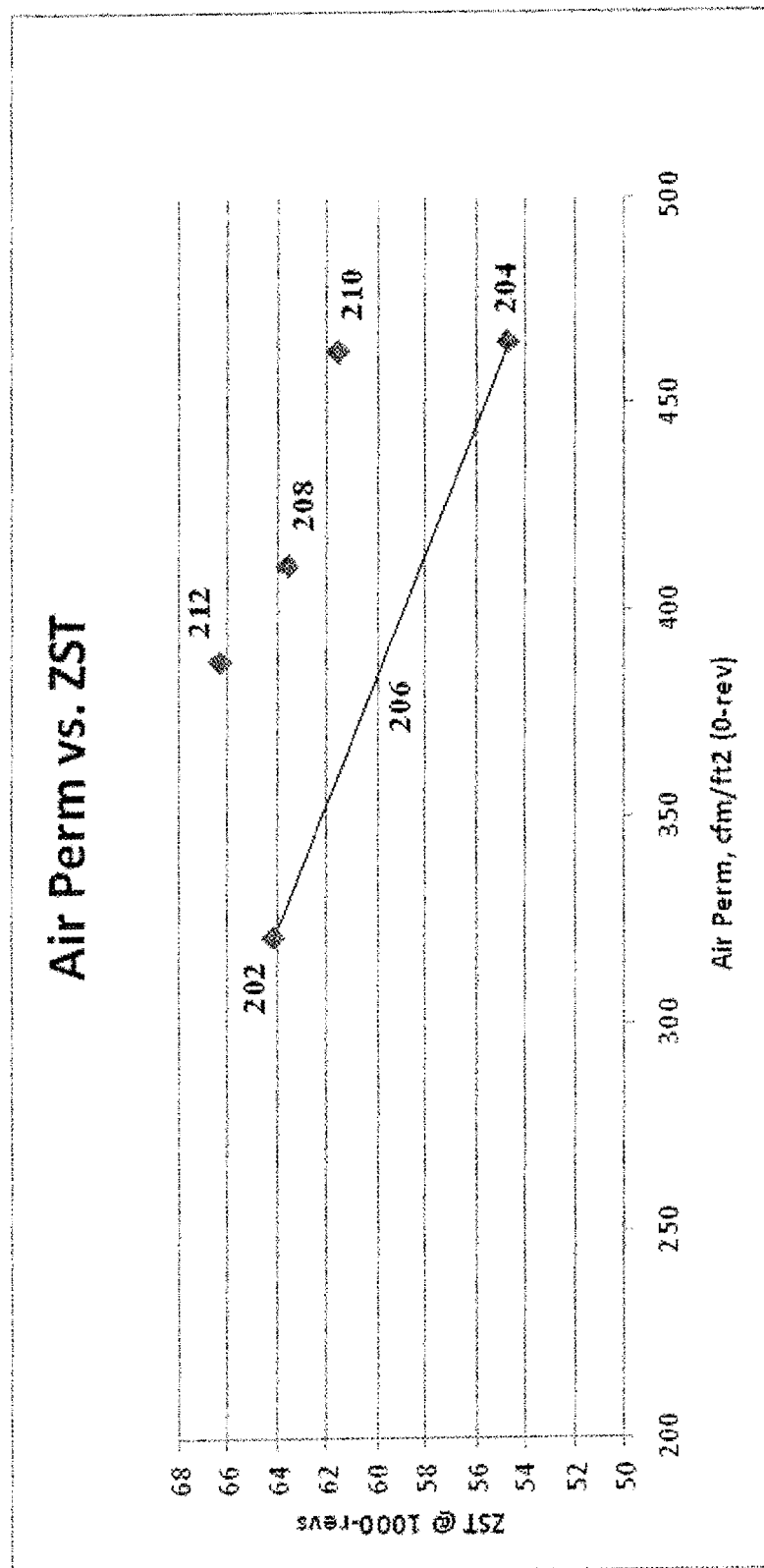
FIG. 2 is a graph showing the wet zero-span tensile at 1000 revs refining versus the air permeability at 0 revs refining of control fibers and semiworks fibers in accordance with one embodiment of the disclosed subject matter.

For example, FIG. 2 is a graph plotting air permeability versus wet tensile of the control fibers. Control fiber 1 (the sheeted fiber) is plotted at 202. Control fiber 2 (the bulk fiber) is plotted at 204. As discussed above, control fiber 1 (the sheeted fiber) has higher ZST but lower air permeability than control fiber 2 (the bulk fiber).

There are methods that allow the strength of control fiber 2 to be increased, if increased strength was desired. Examples of suitable methods for increasing the strength of a fiber include refining and other mechanical treatments. However, these methods result in a decrease in the air permeability of the resulting fiber. Similarly, there are methods that allow the air permeability of control fiber 1 to be increased, if increased air permeability is desired. Examples of suitable methods for increasing the air permeability of a fiber include increased mercerization. However, these methods result in a decrease in the wet tensile of the resulting fiber. These tradeoffs between strength and air permeability general follow a predictable pattern. Thus, known fibers generally have properties in a region near the line 206 between the control fiber 1 202 and control fiber 2 204.

Experimental Fibers

In order to demonstrate proof of concept, lab experimental fibers in accordance with the disclosed subject matter were prepared. The following examples are merely illustrative of the presently disclosed subject matter and they should not be considered as limiting the scope of the invention in any way.

Experimental Fiber 1 is a never-dried, Southern softwood Kraft pulp that was processed for control of fiber length and then underwent water extraction through a screw press, thereby increasing its consistency to 44.2%. An equivalent weight of 250-g.b.d. of this bleached, Kraft softwood pulp was weighed, placed in a clear plastic bag, and heated in a 175° F. temperature controlled water bath for later transfer to a 175° F. heated Hobart® stainless steel mixer bowl. (The Hobart® used was a Legacy model HL300.) Also, water and 50% NaOH were heated to 175° F. in the same water bath for addition as needed to get to consistency and NaOH strength targets. With a target of 28% consistency at 22%-NaOH strength for the pulp mixture, the calculated amount of preheated 175° F. water was added to the preheated 175° F., 44.2% consistency pulp and uniformly mixed in with the Hobart stirring on the lowest speed setting at 94-rpm. Then, the mixer was stopped and the determined amount of preheated 175° F., 50% NaOH was poured over the pulp mixture, and once again mixing continued. Once the 50% NaOH was added, the mixture continued to stir in the Hobart mixer bowl for 15 minutes. At the end of this mixing time, the mixture sat in the heated Hobart mixer bowl for 10 minutes. The caustic-laden pulp was immediately removed from the Hobart mixer bowl and added to a 150° F. preheated low strength, slow agitating NaOH solution in a less than 15-gallon size stainless steel vessel in a 150° F. water bath. By titration, the mixture was determined to be at 14.5% NaOH. Based on pulp mass in the given mix volume, the consistency was determined to be 3%. Total mix time at this condition was 10 minutes. The NaOH-laden mercerized pulp was poured into a 400-mesh screen and spray rinsed with 130-160° F. hot water. The pulp was rinsed until phenolphthalein addition does not turn the pulp mat pink; indicating little to no residual NaOH was still in the pulp. Next, the rinsed mercerized pulp was diluted in 130-160° F. hot water to less than 5% consistency and a pH probe placed into the low consistency pulp mix. The pH of the hand stirred mercerized pulp mixture was adjusted while stirring to a pH of 6.5-7 by slow addition of 10% $H_2SO_4$. Again, the mercerized pulp was poured into a 400-mesh screen and spray rinsed, this time with ambient temperature soft water. Spray washing with the ambient temperature soft water continued for approximately 5-minutes. To remove free water and increase consistency, the pulp was hand-squeezed as it was removed from the 400-mesh screen. Next, the pulp was removed, broken into small masses and spread uniformly over a 20-mesh stainless steel wire drying screen tray. The drying screen tray was inserted into a drying cabinet designed for upward ambient temperature air flow through the screen. Drying to approximately 90% was achieved by allowing the pulp to stay in the operating air flow cabinet overnight.

Experimental Fiber 2 was made using the same process as described above in connection with Experimental Fiber 1 except that the high consistency mercerization was performed at 20% NaOH strength, the high consistency mercerization temperature was initiated and maintained at 155° F., the low consistency mercerization temperature was 155° F., and the low consistency mercerization was performed at 14% NaOH strength.

Experimental Fiber 3 was made using the same process described above in connection with Experimental Fiber 2 except that the low consistency mercerization was performed at 7% NaOH strength.

Samples of each of the Experimental Fibers were further refined using a PFI mill as described above. Physical Properties of the Experimental Fibers are described in Table 2.

TABLE 2

| | | | Lab Experimental Fiber 1 | Lab Experimental Fiber 2 | Lab Experimental Fiber 3 |
|---|---|---|---|---|---|
| Fiber Data | Fiber Length, Wt. Avg. | mm | 2.31 | 2.16 | 2.25 |
| | Fines | % | 2.15 | 3.06 | 2.92 |
| | Fiber Width | um | 28.3 | 29.1 | 29.2 |
| | Curl | % | 43.4 | 43.1 | 42.9 |
| | Kink | 1/m | 3521 | 3601 | 3564 |
| Handsheet Properties | Air Permeability, 0 revs | cfm/ft$^2$ | 376 | 391 | 385 |
| | Air Permeability, 500 revs | cfm/ft$^2$ | 309 | 310 | 314 |
| | Air Permeability, 1000 revs | cfm/ft$^2$ | 286 | 282 | 296 |
| | Tensile, 0 revs | g/in | 63 | 59 | 66 |
| | Tensile, 500 revs | g/in | 198 | 201 | 182 |
| | Tensile, 1000 revs | g/in | 339 | 334 | 320 |
| | Bulk, 0 revs | cc/g | 7.67 | 7.76 | 7.90 |
| | Bulk, 500 revs | cc/g | 6.68 | 6.83 | 7.10 |
| | Bulk, 1000 revs | cc/g | 6.43 | 6.56 | 6.75 |
| | Elongation, 0 revs | % Peak | 9.00 | 8.48 | 8.48 |
| | Elongation, 500 revs | % Peak | 2.35 | 2.53 | 2.34 |
| | Elongation, 1000 revs | % Peak | 2.05 | 1.85 | 1.93 |
| Additional Data | WRV | % | 96.0 | | |
| | Wet 0-Span Tensile@1000 PFI Mill | N/cm | 58.40 | | |

TABLE 2-continued

| | | Lab Experimental Fiber 1 | Lab Experimental Fiber 2 | Lab Experimental Fiber 3 |
|---|---|---|---|---|
| Mercerization Level | Rx Value | 0.65 | 0.67 | 0.67 |
| S-10 | % | 4.83 | | |

As shown in Table 2, the experimental fibers have much higher values for both curl and kink level than the sheeted fiber (control fiber 1) described in Table 1. However, the experimental fibers are also much stronger than the bulk fiber (control fiber 2) described in Table 1. Several other differences are also notable. First, the mercerization level is similar to the mercerization level of the sheeted fiber and higher than the mercerization level of the bulk fiber. In addition, the bulk density is much higher than the bulk density of the sheeted fiber.

Fibers in accordance with the disclosed subject matter can also be manufactured on a commercial scale. Examples of fibers prepared in accordance with such embodiments are described below. As noted above, the following examples are merely illustrative of the presently disclosed subject matter and they should not be considered as limiting the scope of the invention in any way.

Semiworks fiber 1 is a never-dried, bleached, Southern softwood Kraft pulp that was mercerized in a high consistency process, followed by continued mercerization at lower consistency, washed, adjusted to slightly acidic pH, refined, pressed to high consistency, de-flaked, followed by drying and then baling.

Semiworks fiber 1A is a never-dried, bleached, Southern softwood Kraft pulp that was mercerized in a high consistency process, followed by continued mercerization at lower consistency, washed, adjusted to slightly acidic pH, pressed to high consistency, de-flaked, followed by drying and then baling.

Semiworks Fiber 2 is a never-dried, bleached, Southern softwood Kraft pulp that was mercerized in a high consistency process using the same mercerization process that was used in Semiworks Fiber 1 except that less horsepower was used in the mechanical treatment, followed by continued mercerization at lower consistency, washed, adjusted to slightly acidic pH, refined, pressed to high consistency, de-flaked, followed by drying and then baling.

Physical properties of the semiworks fibers are described in Table 3.

TABLE 3

| | | | Semiworks Fiber 1 | Semiworks Fiber 1A | Semiworks Fiber 2 |
|---|---|---|---|---|---|
| Fiber Data | Fiber Length, Wt. Avg | mm | 2.29 | 2.25 | 2.45 |
| | Fines | % | 2.57 | 2.17 | 2.58 |
| | Fiber Width | um | 26.1 | 29.6 | 26.4 |
| | Coarseness | mg/100 m | 35.5 | 38.3 | 34.8 |
| | Curl | % | 42.8 | 48.3 | 42.7 |
| | Kink | 1/m | 3554 | 4087 | 3371 |
| Handsheet Properties | Air Permeability, 0 revs | cfm/ft$^2$ | 411 | 463 | 388 |
| | Air Permeability, 500 revs | cfm/ft$^2$ | 325 | 373 | 314 |
| | Air | cfm/ft$^2$ | 312 | 353 | 297 |

TABLE 3-continued

|  |  |  | Semi-works Fiber 1 | Semi-works Fiber 1A | Semi-works Fiber 2 |
|---|---|---|---|---|---|
|  | Permeability, 1000 revs |  |  |  |  |
|  | Tensile, 0 revs | g/in | 69 | 36 | 90 |
|  | Tensile, 500 revs | g/in | 355 | 173 | 392 |
|  | Tensile, 1000 revs | g/in | 587 | 331 | 595 |
|  | Bulk, 0 revs | cc/g | 7.04 | 7.54 | 6.8 |
|  | Bulk, 500 revs | cc/g | 6.16 | 6.50 | 6.25 |
|  | Bulk, 1000 revs | cc/g | 6.02 | 6.42 | 6 |
|  | Elongation, 0 revs | % Peak | 6.15 | 12.48 | 5.22 |
|  | Elongation, 500 revs | % Peak | 1.87 | 2.05 | 2.02 |
|  | Elongation, 1000 revs | % Peak | 1.75 | 1.83 | 1.87 |
|  | Length, Wt Avg, 0 revs | mm | 2.46 | 2.21 | 2.56 |
|  | Length, Wt Avg, 500 revs | mm | 2.51 | 2.46 | 2.64 |
|  | Length, Wt Avg, 1000 revs | mm | 2.51 | — | 2.71 |
|  | Curl, 0 revs | % | 41.6 | 47 | 39.7 |
|  | Curl, 500 revs | % | 34.3 | 38.9 | 33.2 |
|  | Curl, 1000 revs | % | 32.2 | — | 31.3 |
|  | Kink, 0 revs | 1/m | 3328 | 4032 | 3105 |
|  | Kink, 500 revs | 1/m | 2452 | 2964 | 2222 |
|  | Kink, 1000 revs | 1/m | 2099 | — | 1890 |
| Additional Data | WRV | % | 86.3 | 86.6 | 85.0 |
|  | Wet ZST @ 1000 PFI Mill revs | N/cm | 63.6 | 61.6 | 66.3 |
|  | Mercerization Level | Rx Value | 0.66 | 0.68 | 0.66 |
|  | S-10 | % | 3.65 | 3.25 | 2.85 |
|  | Dust | % | 8.4 | 11.8 | 8.1 |

As shown in Table 3, the semiworks fibers have a high mercerization level and a high wet tensile. Based on these properties, the semiworks fibers resemble the sheeted fiber (control fiber 1) of Table 1. However, the semiworks fibers also have very high values of curl and kink level. Based on these properties, the semiworks fibers resemble the bulk fiber (control fiber 2) of Table 1.

The differences between the semiworks fibers described in Table 3 and each of the control fibers described in Table 1 are emphasized in FIG. 2. As previously discussed, FIG. 2 demonstrates the trade-offs between wet tensile and air permeability in the control fibers. Semiworks fibers 1, 1A, and 2 have also been plotted. Semiworks fiber 1 is shown at 208. Semiworks fiber 1 has similar wet tensile as control fiber 1 202 (63.6 N/cm vs. 64.9 N/cm) but significantly higher air permeability (411 cfm/ft$^2$ vs. 333 cfm/ft$^2$). Thus, in comparison to control fiber 1 (202), semiworks fiber 1 (208) has increased air permeability without sacrificing strength as generally required. Similarly, semiworks fiber 1A (210) has approximately the same air permeability as control fiber 2 (204) (463 cfm/ft$^2$ vs. 467 cfm/ft$^2$) but significantly higher wet tensile (61.6 N/cm vs. 54.4 N/cm). Thus, in comparison to control fiber 2 (204), semiworks fiber 1A (201) has increased strength (as demonstrated using wet tensile) without sacrificing air permeability. Thus, as shown in FIG. 2, the disclosed fibers do not fall within the region around line 206.

As a further example, semiworks fiber 2 (212) has both higher wet tensile (66.3 N/cm vs. 64.9 N/cm) and higher air permeability (388 cfm/ft$^2$ vs. 333 cfm/ft$^2$) than control fiber 1 (202). As discussed above, this is an unexpected result because generally air permeability must be sacrificed in order to increase strength and vice versa.

Figure 3:
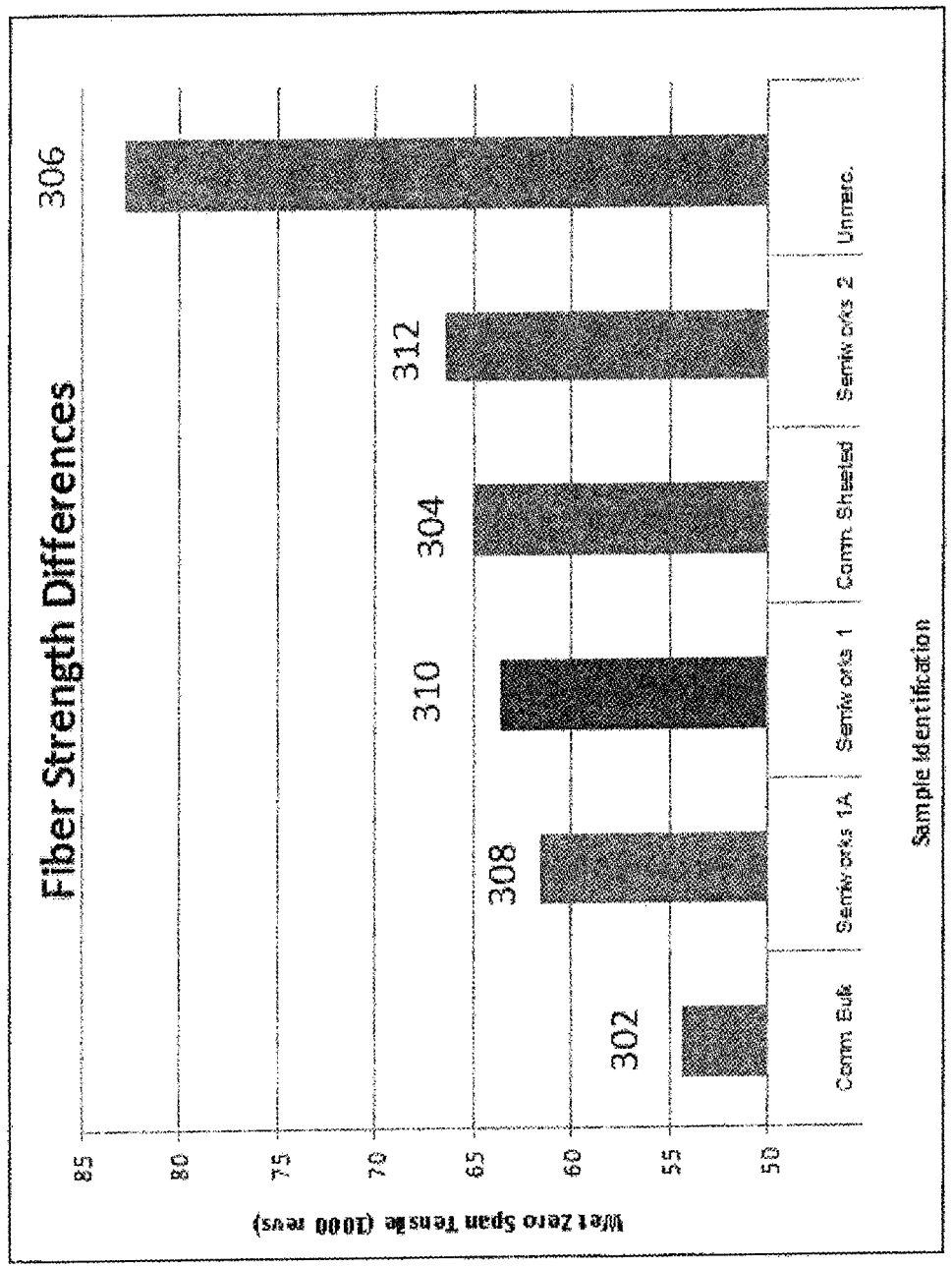
FIG. 3 is a bar graph showing the wet zero-span tensile at 1000 revs of the control fibers, an unmercerized fiber, and semiworks fibers in accordance with one embodiment of the disclosed subject matter.

FIG. 3 emphasizes the tradeoffs between strength and other characteristics of interest. FIG. 3 shows the wet tensile measurements for a series of fibers. The bulk control fiber 302 has a low wet tensile value, while the sheeted control fiber 304 has a higher wet tensile value. For purposes of comparison, the wet tensile value of an unmercerized fiber 306 is also shown. The unmercerized fiber 306 has a very high wet tensile value. However, the unmercerized fiber will also have very low values for air porosity, curl, and kink, as these properties are increased by the mercerization process. The semiworks fibers 308, 310, and 312 all have wet tensile values similar to that of the sheeted control fiber 304. However, as previously discussed, these fibers also have much higher values of air porosity, curl, and kink than the sheeted control fiber 304.

Figure 4:
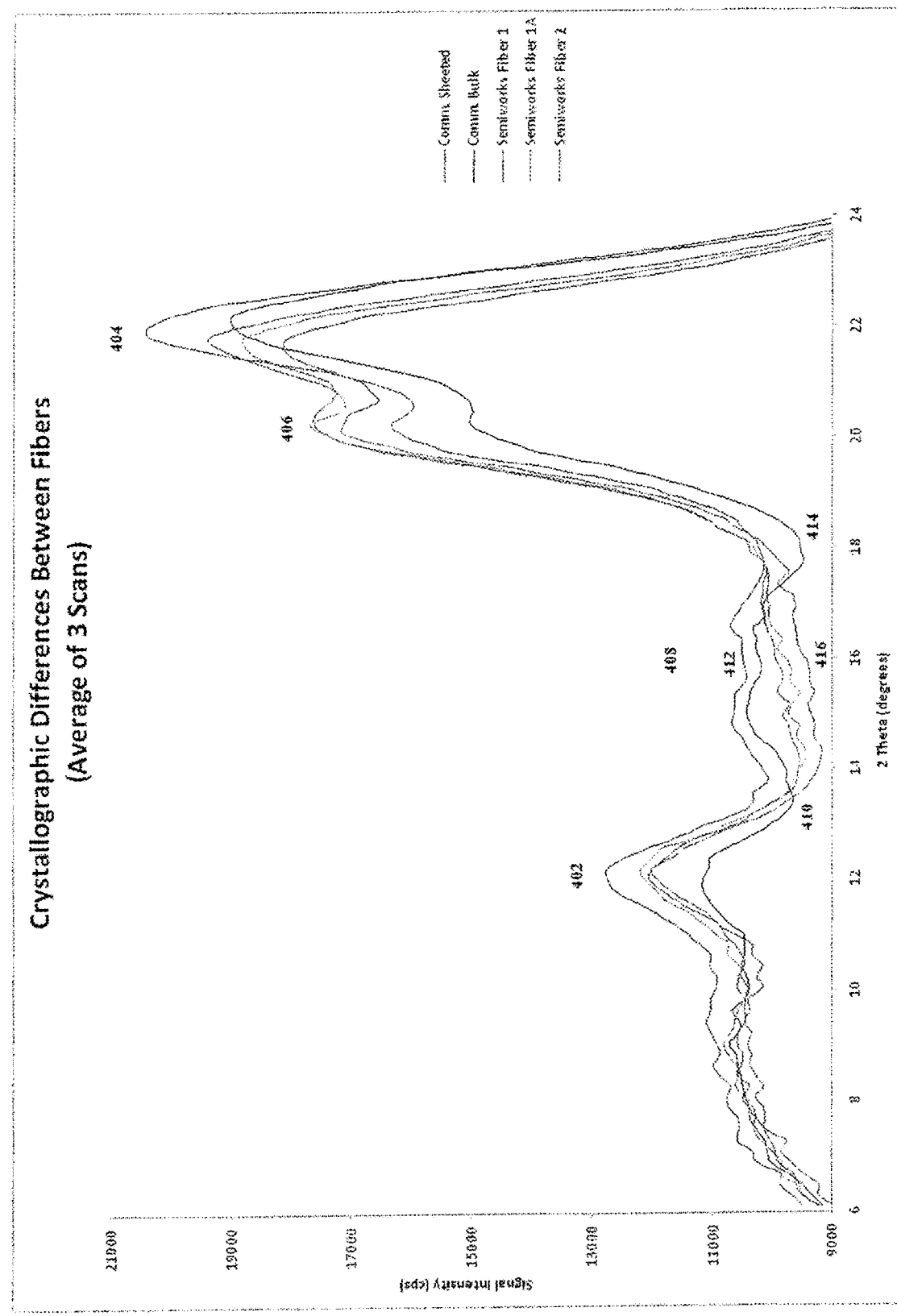
FIG. 4 is a graph showing the X-ray diffraction characteristics of the control fibers and the semiworks fibers in accordance with one embodiment of the disclosed subject matter.

The semiworks fibers similarly exhibit different characteristics in X-ray diffraction measurements. For example, FIG. 4 illustrates x-ray diffraction data for the control fibers and the semiworks fibers. Peak 402 corresponds to cellulose II content. As known to those having ordinary skill in the art, an unmercerized fiber would have no peak at 402. At peak 402, the semiworks fibers are clearly distinguishable from the control fibers. The semiworks fibers also show a higher value at the shoulder 406 of peak 404. In addition, semiworks fibers have fundamentally different x-ray diffraction characteristics at the trough 408. In particular, while the control fibers both show a first trough 410, an intermediate doublet peak 412 (with the first peak of the doublet representing cellulose I content), and a second trough 414, the semiworks fibers do not have similar properties. Instead, the semiworks fibers 416 remain mostly flat throughout trough 408 and, in particular, do not have peaks at either of the locations where the doublet peaks occur for the control fibers). Although not intending to be bound by any particular interpretation of this data, it is believed that these differences in x-ray diffraction characteristics lead to differences in break morphology of the corresponding fibers. Thus, although Applicants have not compared all characteristics of the various fibers disclosed herein in this manner, it is expected that similar relationships could be shown for other pairs of characteristics of interest.

Examples of additional fibers prepared in accordance with embodiments of the disclosed subject matter are described below. As noted above, the following examples are merely illustrative of the presently disclosed subject matter and they should not be considered as limiting the scope of the invention in any way.

Production fiber 1 is a never-dried, bleached, Southern softwood Kraft pulp that was mercerized in a high consistency process, followed by continued mercerization at lower consistency, washed, adjusted to slightly acidic pH, refined, pressed to high consistency, deflaked, followed by drying and then baling.

Production fiber 2 is a never-dried, bleached, Southern softwood kraft pulp that was mercerized in a high consistency process, followed by continued mercerization at lower consistency, washed, adjusted to slightly acidic pH, pressed to high consistency, deflaked, followed by drying and then baling.

Physical properties of the production fibers prepared on a full commercial line are described in Table 4.

TABLE 4

|  |  |  | Production Fiber 1 | Production Fiber 2 |
|---|---|---|---|---|
| Fiber Data | Fiber Length, Wt. Avg | mm | 2.33 | 2.10 |
|  | Fines | % | 3.02 | 3.58 |
|  | Fiber Width | um | 27.2 | 30.2 |
|  | Coarseness | mg/100 m | 33.6 | 37.7 |
|  | Curl | % | 41.6 | 47.1 |
|  | Kink | 1/m | 3490 | 4234 |
| Handsheet Properties | Air Permeability, 0 revs | cfm/ft$^2$ | 415 | 465 |
|  | Air Permeability, 500 revs | cfm/ft$^2$ | 347 | 368 |
|  | Air Permeability, 1000 revs | cfm/ft$^2$ | 341 | 347 |
|  | Tensile, 0 revs | g/in | 78 | 35 |
|  | Tensile, 500 revs | g/in | 411 | 226 |
|  | Tensile, 1000 revs | g/in | 587 | 398 |
|  | Bulk, 0 revs | cc/g | 6.86 | 7.34 |
|  | Bulk, 500 revs | cc/g | 6.19 | 6.52 |
|  | Bulk, 1000 revs | cc/g | 6.07 | 6.34 |
|  | Elongation, 0 revs | % Peak | 5.05 | 11.2 |
|  | Elongation, 500 revs | % Peak | 1.65 | 2.48 |
|  | Elongation, 1000 revs | % Peak | 1.72 | 2.09 |
|  | Length, Wt Avg, 0 revs | mm | 2.46 | 2.14 |
|  | Length, Wt Avg, 500 revs | mm | 2.61 | 2.36 |
|  | Length, Wt Avg, 1000 revs | mm | 2.63 | 2.43 |
|  | Curl, 0 revs | % | 41.2 | 47.0 |
|  | Curl, 500 revs | % | 35.0 | 40.7 |
|  | Curl, 1000 revs | % | 33.1 | 37.5 |
|  | Kink, 0 revs | 1/m | 3408 | 4446 |
|  | Kink, 500 revs | 1/m | 2495 | 3624 |
|  | Kink, 1000 revs | 1/m | 2213 | 3182 |
| Additional Data | WRV | % | 91.2 | 87.9 |
|  | Wet ZST @ 1000 PFI Mill revs | N/cm | 65.2 | 57.6 |
|  | Mercerization Level | Rx Value | 0.71 | 0.69 |
|  | S-10 | % | 3.37 | 4.16 |
|  | Dust | % | 6.7 | 11.1 |

As with the semiworks fibers shown in Table 3, the production fibers shown in Table 4 have a high mercerization level and a high wet tensile. Based on these properties, the production fibers resemble the sheeted fiber (control fiber 1) of Table 1. However, the production fibers also have very high values of curl and kink level. Based on these properties, the production fibers resemble the bulk fiber (control fiber 2) of Table 1.

For example, production fiber 1 has similar wet tensile as control fiber 1 (65.2 N/cm v. 64.9 N/cm) but significantly higher air permeability (415 cfm/ft$^2$ v. 333 cfm/ft$^2$). Thus, in comparison to control fiber 1, production fiber 1 has increased air permeability without sacrificing strength as generally required. Similarly, production fiber 2 and control fiber 2 have about the same air permeability (465 cfm/ft$^2$ vs. 467 cfm/ft$^2$) but production fiber 2 has a higher wet tensile (57.6 N/cm vs. 54.4 N/cm). Thus, in comparison to control fiber 2, production fiber 2 has increased wet tensile without sacrificing air permeability.

The fibers in accordance with the disclosed subject matter can also maintain their structural integrity. As known in the art, cellulose fibers generally consist of three layers that will be referred to as the S1 layer (the outermost layer), the S2 layer (the middle layer), and the S3 layer (the innermost layer). When subjected to certain process conditions, the S1 layer can delaminate from the S2 layer but is not completely removed from the fiber. Such delamination can cause the overall strength of the fibers to decrease because the fibers slip rather than providing strength (i.e., the S1 layer will completely detach from the S2 layer upon being subjected to a force).

Fibers in accordance with the disclosed subject matter can maintain structural integrity in that the outermost layer does not delaminate from the middle layer. In accordance with embodiments of the disclosed subject matter, at least 50% of the fibers do not have outer layers delaminated from the middle layer. For example, at least 60%, at least 65%, at least 70%, at least 75%, at least 80%, at least 85%, or at least 90% of the fibers do not have outer layers delaminated from the middle layer.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A fibrous structure comprising mercerized cellulose fiber having:
    (a) an x-ray diffraction coefficient of at least about 0.58;
    (b) a curl of at least about 38%;
    (c) a kink level of at least about 3200 kinks per meter; and
    (d) a length-weighted fiber length of at least about 1.9 mm,
    wherein the fibrous structure has a wet tensile of at least 57.5 N/cm at 1000 revs refining and an air permeability of at least 450 cfm/ft$^2$ at 0 revs refining.

2. The fibrous structure of claim 1, wherein the mercerized cellulose fiber has a curl of at least about 46%.

3. The fibrous structure of claim 1, wherein the mercerized cellulose fiber has a kink level of at least about 4100 kinks per meter.

4. The fibrous structure of claim 1, wherein the mercerized cellulose fiber has an x-ray diffraction coefficient of at least about 0.68.

5. The fibrous structure of claim 1, wherein the mercerized cellulose fiber has an S-10 level of less than about 5.0% when steeped in a 10% NaOH solution.

6. The fibrous structure of claim 1, wherein the fibrous structure has a wet tensile of at least about 57 N/cm at 1000 revs refining.

7. The fibrous structure of claim 1, wherein the fibrous structure has an air permeability of at least about 460 cfm/ft$^2$ at 0 revs refining.

8. The fibrous structure of claim 1, wherein the fibrous structure has a tensile strength of at least about 225 g/in at 500 revs refining.

9. The fibrous structure of claim 1, wherein the mercerized cellulose fiber has a dust level of less than about 11.5%.

10. The fibrous structure of claim 1, wherein the mercerized cellulose fiber maintains structural integrity.

11. A fibrous structure comprising mercerized cellulose fiber having:
   (a) an x-ray diffraction coefficient of at least about 0.58;
   (b) a curl of at least about 38%;
   (c) a kink level of at least about 3200 kinks per meter; and
   (d) a length-weighted fiber length of at least about 1.9 mm,
   wherein the fibrous structure has a wet tensile of at least 62 N/cm at 1000 revs refining and an air permeability of at least 370 cfm/ft$^2$ at 0 revs refining.

12. The fibrous structure of claim 11, wherein the mercerized cellulose fiber has a curl of at least about 42%.

13. The fibrous structure of claim 11, wherein the mercerized cellulose fiber has a kink level of at least about 3300 kinks per meter.

14. The fibrous structure of claim 11, wherein the mercerized cellulose fiber has an x-ray diffraction coefficient of at least about 0.65.

15. The fibrous structure of claim 11, wherein the mercerized cellulose fiber has an S-10 level of less than about 3.0% when steeped in a 10% NaOH solution.

16. The fibrous structure of claim 11, wherein the fibrous structure has a wet tensile of at least about 66 N/cm at 1000 revs refining.

17. The fibrous structure of claim 11, wherein the fibrous structure has an air permeability of at least about 380 cfm/ft$^2$ at 0 revs refining.

18. The fibrous structure of claim 11, wherein the fibrous structure has a tensile strength of at least about 390 g/in at 500 revs refining.

19. The fibrous structure of claim 11, wherein the mercerized cellulose fiber has a dust level of less than about 8.5%.

20. The fibrous structure of claim 11, wherein the mercerized cellulose fiber maintains structural integrity.

* * * * *